(12) United States Patent
Marshall

(10) Patent No.: US 10,940,717 B2
(45) Date of Patent: Mar. 9, 2021

(54) SHAFT LOCKING ASSEMBLY, SYSTEM, AND METHOD FOR USE IN AN APPARATUS TO PROVIDE MOTION CONTROL OF THE APPARATUS

(71) Applicant: The Boeing Company, Chicago, IL (US)

(72) Inventor: Travis T. Marshall, Saint Peters, MO (US)

(73) Assignee: The Boeing Company, Chicago, IL (US)

( * ) Notice: Subject to any disclaimer, the term of this patent is extended or adjusted under 35 U.S.C. 154(b) by 105 days.

(21) Appl. No.: 16/218,465

(22) Filed: Dec. 12, 2018

(65) Prior Publication Data
US 2020/0189317 A1    Jun. 18, 2020

(51) Int. Cl.
*B60B 33/00* (2006.01)
*F16H 19/04* (2006.01)

(52) U.S. Cl.
CPC ...... *B60B 33/0094* (2013.01); *B60B 33/0049* (2013.01); *F16H 19/043* (2013.01); *F16H 2019/046* (2013.01)

(58) Field of Classification Search
CPC .. F16H 2019/046; F16D 94/00; F16D 63/006; F16D 2121/16; F16D 2125/60; B60B 33/021; B60B 33/0042; B60B 33/0049; B60B 33/0057; B60B 33/0068; B60B 33/0094; B60B 33/00; B60B 33/02; B60B 33/0039; B60B 33/0086; B60B 33/0073; B60B 33/0078; B60B 33/0092

USPC ............. 188/1.12, 31, 60, 69; 16/18 R, 35 R
See application file for complete search history.

(56) References Cited

U.S. PATENT DOCUMENTS

| | | | |
|---|---|---|---|
| 3,348,645 A | 10/1967 | Sigg | |
| 5,139,116 A | 8/1992 | Screen | |
| 5,232,071 A | 8/1993 | Kawanabe | |
| 2001/0030088 A1* | 10/2001 | Lumpkin | F16D 55/224 188/72.1 |
| 2010/0038193 A1* | 2/2010 | D'Amore | F16D 71/00 188/158 |
| 2011/0048867 A1* | 3/2011 | Solinski | B62B 9/087 188/20 |

* cited by examiner

*Primary Examiner* — Robert A. Siconolfi
*Assistant Examiner* — San M Aung

(57) ABSTRACT

In one version there is provided a shaft locking assembly for use in an apparatus, to provide motion control and unwanted movement elimination of the apparatus. The shaft locking assembly includes a locking device with a locking shaft having a castellated ring element with castellations. The shaft locking assembly includes a drive shaft and a rotating element disposed around the drive shaft. The shaft locking assembly includes a retaining structure assembly having a side portion with projection members corresponding to the castellations. The shaft locking assembly is in a locked position when the castellations are engaged and interlocked with the projection members, and the shaft locking assembly is in an unlocked position when a shaft engagement device is engaged with the drive shaft and the locking shaft, and actuates the locking shaft, so that the castellations are disengaged and unlocked from the projection members, and rotates the drive shaft.

21 Claims, 16 Drawing Sheets

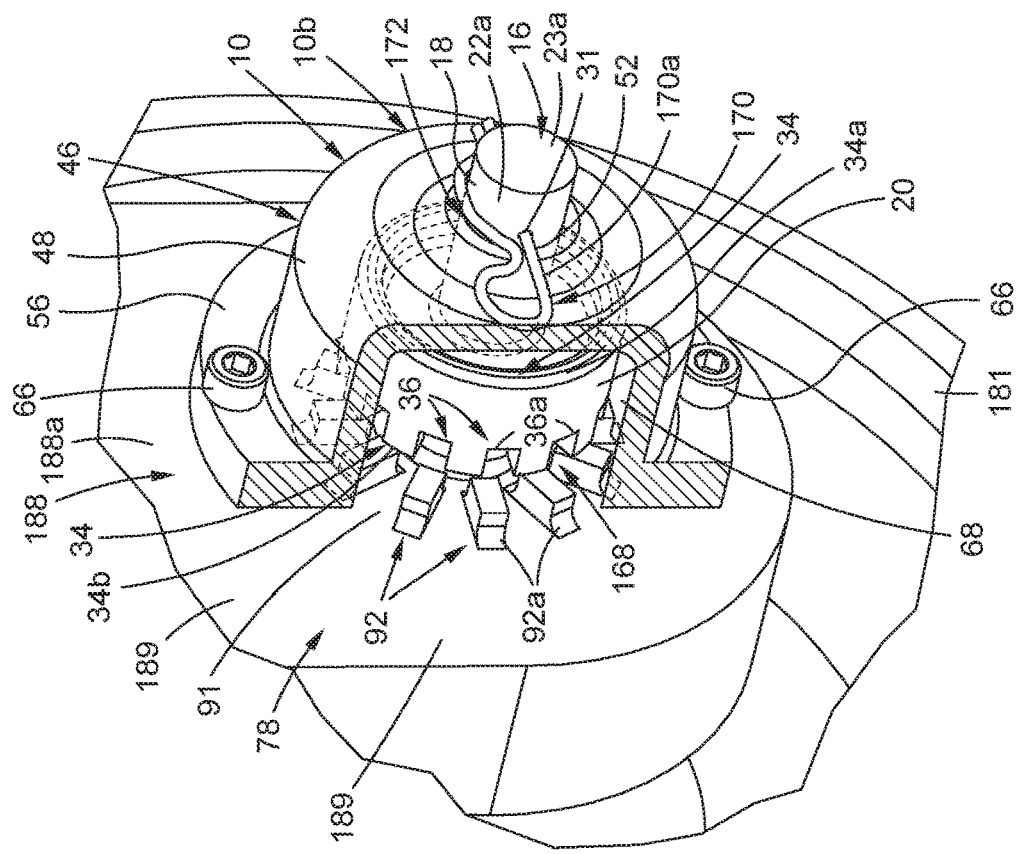
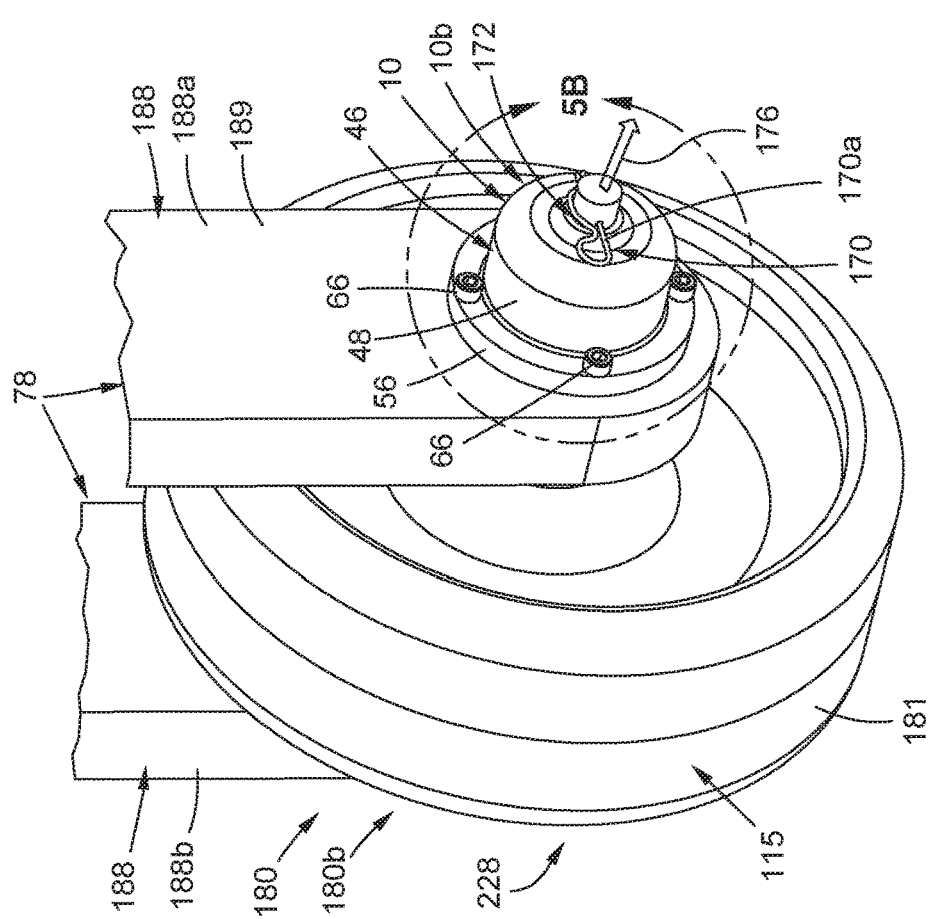
FIG. 5B
FIG. 5A

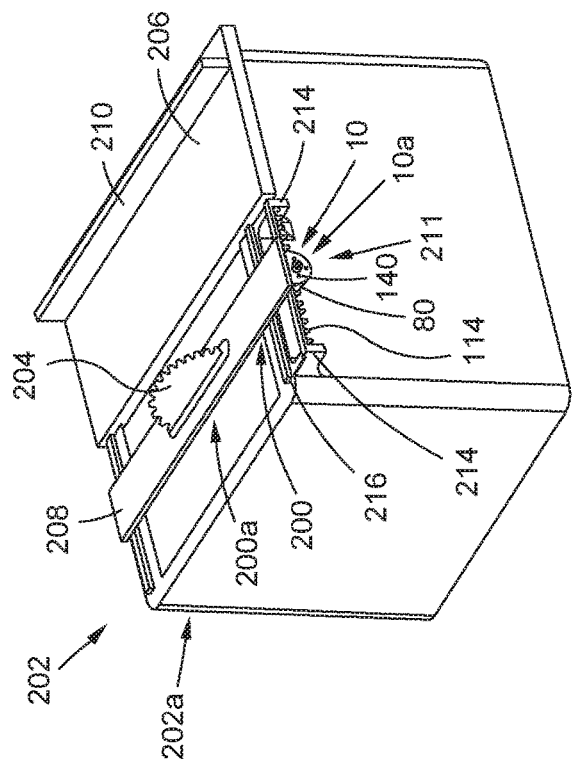
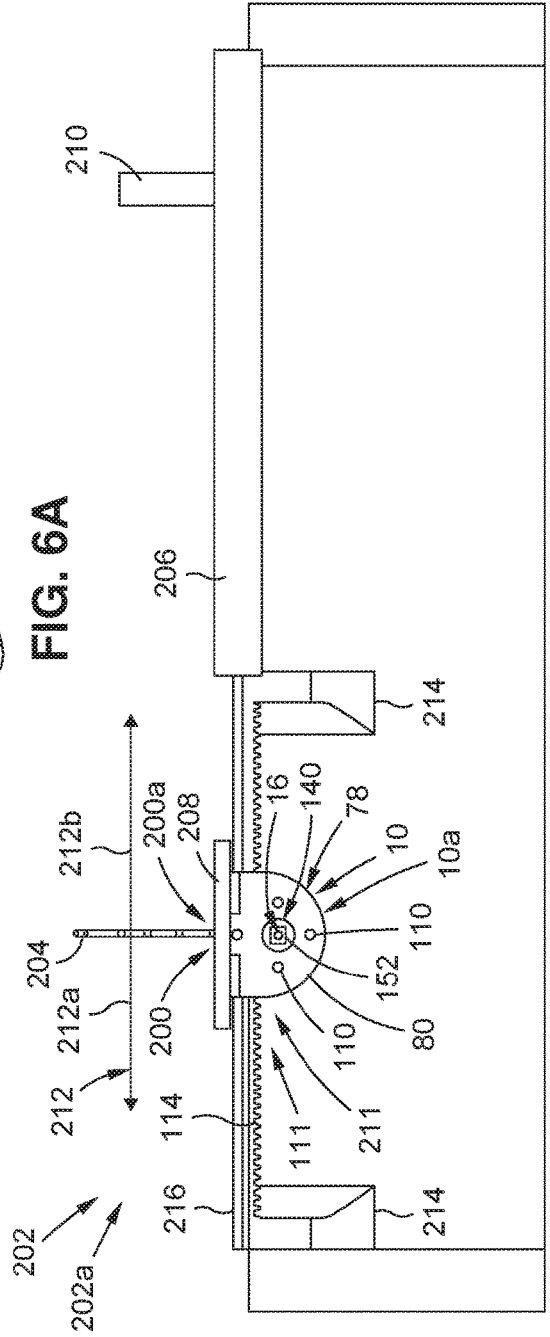
FIG. 6A
FIG. 6B

SHAFT LOCKING ASSEMBLY, SYSTEM, AND METHOD FOR USE IN AN APPARATUS TO PROVIDE MOTION CONTROL OF THE APPARATUS

BACKGROUND

1) Field of the Disclosure

The disclosure relates generally to locking devices, systems, and methods, and more particularly, to locking devices, systems, and methods for use in caster mounted devices, rotary equipment, and assemblies to be positioned or moved.

2) Description of Related Art

Caster mounted devices, such as those with wheel casters, for example, carts and dollies, and rotary equipment, such as tooling and linear positioning equipment with shaft control devices, may often require the ability to move in a controlled manner, and at other times may require being locked in one position to prevent rotation.

Known rack and pinion locking devices and methods, and known wheel and axle locking devices and methods may not be associated or coordinated to the device's rotary motion. When applied, such known devices and methods may typically rely on friction to limit rotation, and when released, there may be no method of control over the rack, axle, shaft, or wheel. In addition, such known devices and methods may be ineffective in the presence of liquids, and may vary with temperature.

Other known devices and methods may use pins, which are independent of a driving component, and which may typically require a two-step operation to drive and lock the axle, shaft, or wheel. Such a two-step operation may make it difficult to control the position of the axle, shaft, or wheel, when it is in the locked position.

Therefore, it would be advantageous to have a shaft locking assembly, system, and method for use in an apparatus, to provide motion control of the apparatus, to provide unwanted movement elimination, to provide automatic locking, and to provide advantages over known assemblies, systems, and methods.

SUMMARY

Example implementations of this disclosure provide for a shaft locking assembly, system, and method for use in an apparatus to provide motion control of the apparatus and to provide significant advantages over known assemblies, systems, and methods.

In one version there is provided a shaft locking assembly for use in an apparatus, to provide motion control and unwanted movement elimination of the apparatus. The shaft locking assembly comprises a locking device comprising a locking shaft with a castellated ring element disposed on the locking shaft. The castellated ring element has a plurality of castellations, and the locking shaft has a splined portion on an exterior of the locking shaft.

The shaft locking assembly further comprises a drive shaft having a splined central through opening. The splined portion of the locking shaft is disposed within, and corresponds to, the splined central through opening of the drive shaft.

The shaft locking assembly further comprises a rotating element disposed around an exterior portion of the drive shaft. The shaft locking assembly further comprises a retaining structure assembly retaining the locking device, the drive shaft, and the rotating element. The retaining structure assembly has a side portion with a plurality of projection members corresponding to the plurality of castellations of the castellated ring element.

The shaft locking assembly is in a locked position when the plurality of castellations are engaged and interlocked with the plurality of projection members. The shaft locking assembly moves from the locked position to an unlocked position, when a shaft engagement device is engaged with the drive shaft and the locking shaft, and actuates the locking shaft, so that the plurality of castellations are disengaged and unlocked from the plurality of projection members, and the shaft engagement device rotates the drive shaft, which rotates the locking shaft and the rotating element, to provide motion control and unwanted movement elimination of the apparatus.

In another version there is provided a shaft locking system for use in an apparatus, to provide motion control and unwanted movement elimination of the apparatus. The shaft locking system comprises a shaft locking assembly. The shaft locking assembly comprises a locking device comprising a locking shaft with a castellated ring element disposed on the locking shaft. The castellated ring element has a plurality of castellations, and the locking shaft has a splined portion on an exterior of the locking shaft.

The shaft locking assembly further comprises a drive shaft having a splined central through opening. The splined portion of the locking shaft is disposed within, and corresponds to, the splined central through opening of the drive shaft. The drive shaft further has a cylindrical splined body portion.

The shaft locking assembly further comprises a rotating element disposed around the cylindrical splined body portion of the drive shaft. The shaft locking assembly further comprises a retaining structure assembly retaining the locking device, the drive shaft, and the rotating element. The retaining structure assembly has a side portion with a plurality of projection members corresponding to the plurality of castellations of the castellated ring element.

The shaft locking assembly further comprises a support cap coupled to the retaining structure assembly. The support cap covers the castellated ring element and a first end portion of the locking shaft. The support cap has a central opening for insertion of the first end portion of the locking shaft.

The shaft locking system further comprises a shaft engagement device for engaging a drive end of the drive shaft and a second end portion of the locking shaft, and for actuating the locking shaft from a locked position to an unlocked position. The shaft locking system further comprises a holding element for insertion into an opening formed through the first end portion of the locking shaft. The holding element holds the first end portion at an outward distance from a first end of the support cap.

The shaft locking assembly is in the locked position when the plurality of castellations are engaged and interlocked with the plurality of projection members. The shaft locking assembly moves from the locked position to an unlocked position, when a shaft engagement device is engaged with the drive shaft and the locking shaft, and actuates the locking shaft, so that the plurality of castellations are disengaged and unlocked from the plurality of projection members, and the shaft engagement device rotates the drive shaft, which rotates the locking shaft and the rotating element, to provide motion control and unwanted movement elimination of the apparatus.

In another version there is provided a method of using a shaft locking assembly in an apparatus, to provide motion control and unwanted movement elimination of the apparatus. The method comprises the step of providing the shaft locking assembly in a locked position in the apparatus. The shaft locking assembly comprises a locking device comprising a locking shaft having a first end and a second end, and having a castellated ring element disposed on the locking shaft. The castellated ring element has a plurality of castellations, and the locking shaft has a splined portion on an exterior of the locking shaft.

The shaft locking assembly further comprises a drive shaft having a drive end with a drive opening, and having a splined central through opening. The splined portion of the locking shaft is disposed within, and corresponds to, the splined central through opening of the drive shaft.

The shaft locking assembly further comprises a rotating element disposed around an exterior portion of the drive shaft. The shaft locking assembly further comprises a retaining structure assembly retaining the locking device, the drive shaft, and the rotating element. The retaining structure assembly has a side portion with a plurality of projection members engaged and interlocked with the plurality of castellations in the locked position.

The method further comprises the step of engaging, with a shaft engagement device, the drive opening of the drive shaft and the second end of the locking shaft. The method further comprises the step of actuating the locking shaft with the shaft engagement device, to disengage the plurality of castellations from the plurality of projection members, and to move the shaft locking assembly from the locked position to an unlocked position.

The method further comprises the step of rotating the shaft engagement device, to rotate the drive shaft, which rotates the locking shaft and the rotating element, to position the locking shaft, and to provide motion control and unwanted movement elimination of the apparatus. The method may further comprise after the rotating step, the step of inserting a holding element into a first end portion of the locking shaft, to hold the locking shaft at an outward distance, to allow the apparatus to move in a free motion.

The features, functions, and advantages that have been discussed can be achieved independently in various versions or embodiments of the disclosure or may be combined in yet other versions or embodiments, further details of which can be seen with reference to the following description and drawings.

BRIEF DESCRIPTION OF THE DRAWINGS

The disclosure can be better understood with reference to the following detailed description taken in conjunction with the accompanying drawings which illustrate exemplary versions or embodiments, but which are not necessarily drawn to scale, wherein:

FIG. 5A is an illustration of an enlarged front perspective view of a shaft locking assembly having a caster mounted design with a direct drive caster wheel assembly, and showing a holding element holding a locking shaft in an outward direction;

FIG. 5B is an illustration of an enlarged front perspective view of circle 5B of FIG. 5A, showing the shaft locking assembly in an unlocked position;

FIG. 6A is an illustration of a front perspective view of a version of a shaft locking assembly of the disclosure, where the shaft locking assembly is used in a positioning apparatus;

FIG. 6B is an illustration of a front view of the shaft locking assembly and the positioning apparatus of FIG. 6A;

Figure 1A:
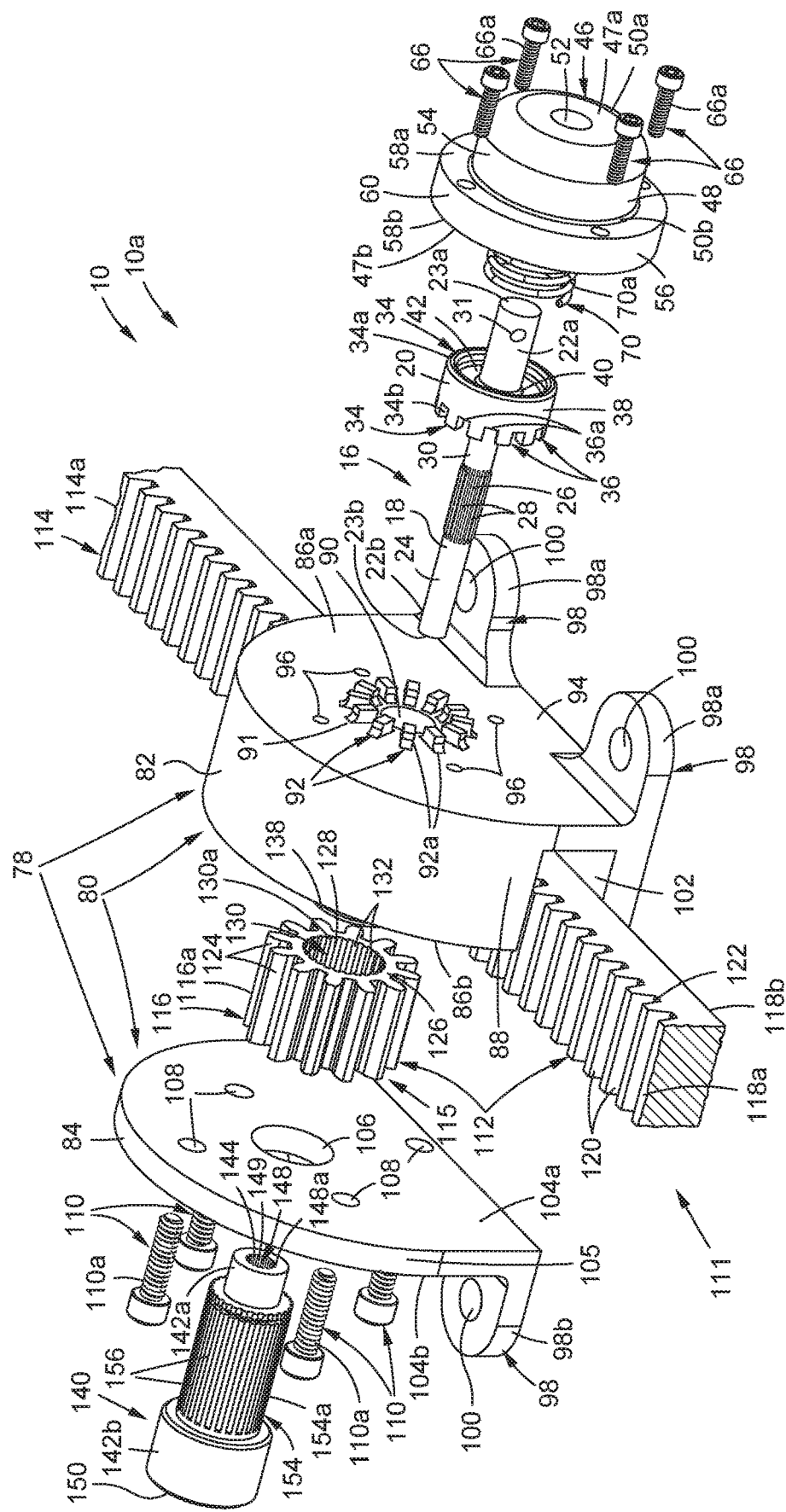
FIG. 1A is an illustration of an exploded front perspective view of a version of a shaft locking assembly of the disclosure, where the shaft locking assembly has a rack and pinion design.

Each figure shown in this disclosure shows a variation of an aspect of the embodiments presented, and only differences will be discussed in detail.

DETAILED DESCRIPTION

Disclosed versions or embodiments will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

Now referring to the Figures, FIGS. 1A-1D show a version of a shaft locking assembly 10, such as a shaft locking assembly 10a, of the disclosure, for use in an apparatus 200 (see FIGS. 6A, 7A, 8), to provide motion control 232 (see FIG. 8) and unwanted movement elimination 236 (see FIG. 8) of the apparatus 200. Preferably, the shaft locking assembly 10, such as the shaft locking assembly 10a, is an automatic shaft locking assembly 12 (see FIG. 8).

Figure 1B:
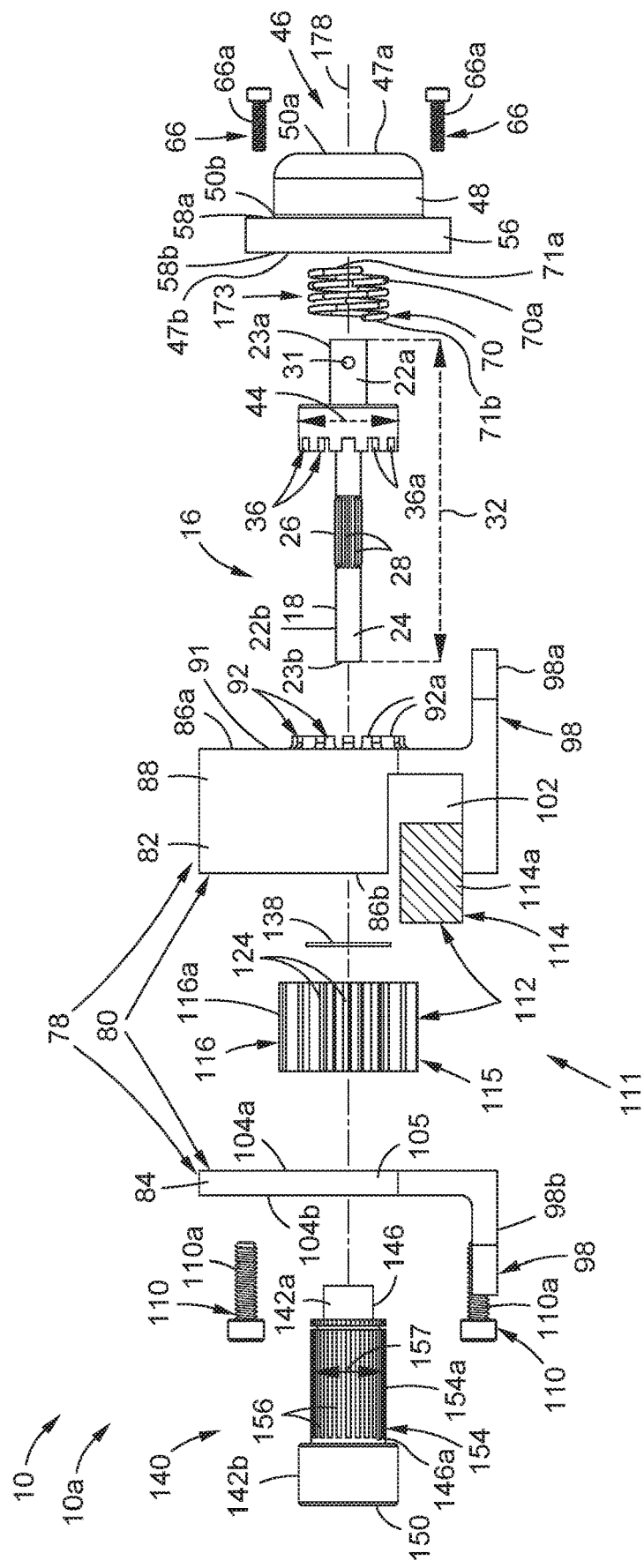
FIG. 1B is an illustration of an exploded side view of the shaft locking assembly of FIG. 1A.
Figure 1C:
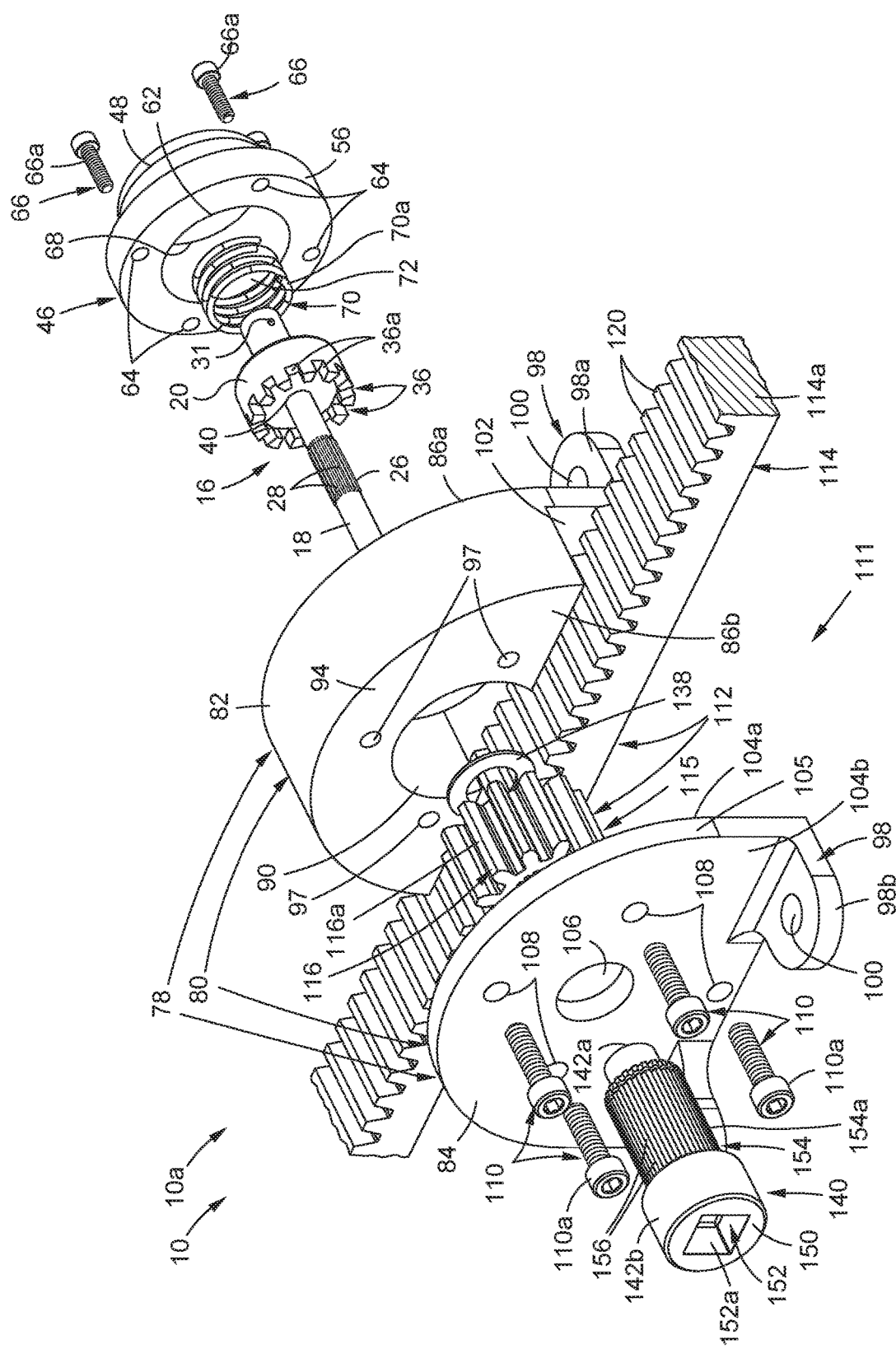
FIG. 1C is an illustration of an exploded back perspective view of the shaft locking assembly of FIG. 1A.
Figure 1D:
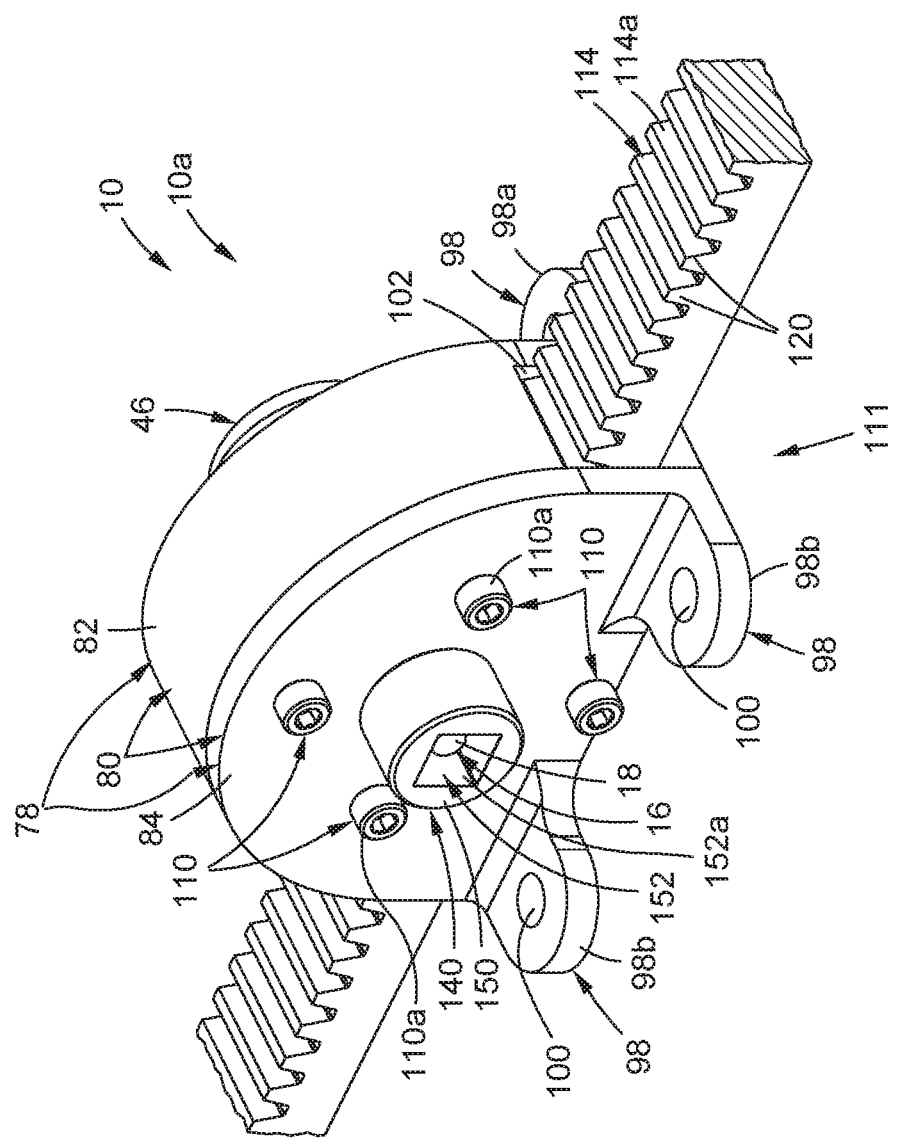
FIG. 1D is an illustration of a back perspective view of the shaft locking assembly of FIG. 1C, that is assembled.

FIG. 1A is an illustration of an exploded front perspective view of a version of the shaft locking assembly 10, such as the shaft locking assembly 10a, of the disclosure, where the shaft locking assembly 10 has a rack and pinion design 111. FIG. 1B is an illustration of an exploded side view of the shaft locking assembly 10, such as the shaft locking assembly 10a, of FIG. 1A. FIG. 1C is an illustration of an exploded back perspective view of the shaft locking assembly 10, such as the shaft locking assembly 10a, of FIG. 1A. FIG. 1D is an illustration of a back perspective view of the shaft locking assembly 10, such as the shaft locking assembly 10a, of FIG. 1C, that is assembled.

As shown in FIGS. 1A-1D, the shaft locking assembly 10, such as the shaft locking assembly 10a, comprises a locking device 16 comprising a locking shaft 18 with a castellated ring element 20 (see FIGS. 1A, 1C) disposed on the locking shaft 18. The locking device 16 may be formed or manufactured as a unitary structure, or may be formed or manufactured as a separate locking shaft 18 and a separate castellated ring element 20 that are fixedly attached together.

As shown in FIGS. 1A-1B, the locking shaft 18 comprises a first end portion 22a with a first end 23a, a second end portion 22b with a second end 23b, and a body 24 formed between the first end 23a and the second end 23b. The body 24 has a splined portion 26 (see FIGS. 1A-1C) with a plurality of exterior splines 28 (see FIGS. 1A-1C) formed on an exterior 30 (see FIG. 1A). The locking shaft 18 may further comprise a through opening 31 (see FIGS. 1A-1C) formed through the first end portion 22a. The locking shaft 18 has a length 32 (see FIG. 1B).

As shown in FIG. 1A, the castellated ring element 20 has ends 34, including a first end 34a and a second end 34b. The second end 34b of the castellated ring element 20 comprises a plurality of castellations 36 (see FIGS. 1A-1C), such as in the form of a plurality of notches 36a (see FIG. 1-1C). The castellated ring element 20 preferably comprises a cylindrical body 38 (see FIG. 1A) with a central through opening 40 (see FIGS. 1A, 1C) for receiving, or configured to receive the locking shaft 18. The castellated ring element 20 (see FIG. 1A) is attached or formed around a portion of the locking shaft 18, preferably near the first end portion 22a (see FIG. 1A), and the castellated ring element 20 has a recessed interior portion 42 (see FIG. 1A). The castellated ring element 20 further comprises an outer diameter 44 (see FIG. 1B). The castellated ring element 20 may be comprised of a metal material, such a steel or stainless steel, or another suitable metal material. The castellated ring element 20 may also be made of a high strength, hard, thermoplastic material, such as polyoxymethylene, acetal homopolymer resin, or another suitable high strength, hard, thermoplastic material.

As shown in FIGS. 1A-1D, the shaft locking assembly 10 further comprises a retaining structure assembly 78, such as in the form of a housing assembly 80, discussed in detail below, and may further comprise a support cap 46 coupled to the retaining structure assembly 78. When the shaft locking assembly 10 is assembled, the support cap 46 preferably covers and protects the castellated ring element 20 and the first end portion 22a of the locking shaft 18. As shown in FIGS. 1A-1B, the support cap 46 has a first end 47a and a second end 47b. The second end 47b is preferably configured for attachment to the retaining structure assembly 78.

As shown in FIGS. 1A-1C, the support cap 46 comprises a head portion 48 coupled or attached to a collar portion 56. The support cap 26 may be formed or manufactured as a unitary structure, or may be formed or manufactured as a separate head portion 48 and a separate collar portion 56 that are fixedly attached together. The head portion 48 comprises a first end 50a (see FIGS. 1A-1B), a second end 50b (see FIGS. 1A-1B), a central opening 52 (see FIG. 1A), and a cylindrical body 54 (see FIG. 1A). The collar portion 56 comprises a first end 58a (see FIGS. 1A-1B), a second end 58b (see FIGS. 1A-1B), a cylindrical body 60 (see FIG. 1A), and a central through opening 62 (see FIG. 1C). The collar portion 56 further comprises a plurality of support cap fastener through openings 64 (see FIG. 1C) formed through the cylindrical body 60 of the support cap 46. Each of the plurality of support cap fastener through openings 64 (see FIG. 1C) receive, or are configured to receive, a support cap fastener 66 (see FIGS. 1A-1C), such as in the form of a bolt 66a (see FIGS. 1A-1C), or another suitable fastener. As shown in FIG. 1C, the support cap 46 has a hollow interior portion 68. The hollow interior portion 68 and the central opening 52 (see FIG. 1A) of the support cap 46 receive, or are configured to receive, the first end portion 22a (see FIG. 1A) of the locking shaft 18 (see FIG. 1A, for insertion through the hollow interior portion 68 and the central opening 52.

As shown in FIGS. 1A-1C, in one version, the shaft locking assembly 10 may further comprise a spring element 70, such as a metal spring 70a, or another suitable spring element 70, positioned or coupled between the castellated ring element 20 and the support cap 46, when the support cap 46 is attached to the retaining structure assembly 78. In particular, the spring element 70 is coupled between the first end 34a (see FIG. 1A) of the castellated ring element 20 and an interior wall portion 69 (see FIG. 2A) of the support cap 46. As shown in FIG. 1B, the spring element 70, such as the metal spring 70a, comprises a first end 71a and a second end 71b. When the shaft locking assembly 10 is assembled, the first end 71a of the spring element 70 is adjacent the interior wall portion 69 (see FIG. 2A) of the support cap 46, and the second end 71b is adjacent the first end 34a (see FIG. 1A) of the castellated ring element 20 (see FIG. 1A). As shown in FIG. 1C, the spring element 70, such as the metal spring 70a, further comprises a central through opening 72 that receives, or is configured to receive, the first end portion 22a (see FIG. 1A) of the locking shaft 18 (see FIG. 1A).

The spring element 70 provides a locking force 74 (see FIG. 8), such as a spring force 76 (see FIG. 8), to the castellated ring element 20, to provide automatic locking 238 (see FIG. 8) of the shaft locking assembly 10. Alternatively, instead of the spring element 70 providing the locking force 74, an electronic device 162 (see FIG. 8), such as an electronic solenoid 162a (see FIG. 8), or a pneumatic device 164 (see FIG. 8), such as a pneumatic solenoid 164a (see FIG. 8) or an air valve assembly 164b (see FIG. 8), may be used to provide the locking force 74.

As shown in FIGS. 1A-1B, the shaft locking assembly 10, such as shaft locking assembly 10a, comprises in one version, the retaining structure assembly 78, such as in the form of a housing assembly 80. The retaining structure assembly 78, such as in the form of the housing assembly 80 comprises a central through opening 81 (see FIGS. 2A-2B), when the shaft locking assembly 10 is assembled. As shown in FIGS. 1A-1D, the housing assembly 80 comprises a first housing portion 82 and a second housing portion 84. The first housing portion 82 comprises a first side 86a (see FIGS. 1A-1C), a second side 86b (see FIGS. 1A-1C), a body 88 (see FIGS. 1A-1B) formed between the first side 86a and the second side 86b, an exterior 94 (see FIGS. 1A, 1C), and a central through opening 90 (see FIGS. 1A, 1C) formed through the body 88. The central through opening 90 (see FIG. 1C) of the first housing portion 82 (see FIG. 1C) is configured for housing a rotating element 115 (see FIG. 1C), such as a pinion 116 (see FIG. 1C), and is configured for partially housing a drive shaft 140 (see FIG. 1C) and the locking shaft 18 (see FIG. 1C).

As shown in FIGS. 1A-1B, the first side 86a has a side portion 91 with a plurality of projection members 92, such as in the form of a plurality of mating castellations 92a, fixed to the side portion 91 of the first side 86a and projecting outwardly from the side portion 91 of the first side 86a. The plurality of projection members 92, such as in the form of a plurality of mating castellations 92a, correspond to and interlock with, or are configured to correspond to and interlock with, the plurality of castellations 36, such as in the form of notches 36a, of the castellated ring element 20, when the shaft locking assembly 10 is in a locked position 166 (see FIG. 2A).

As shown in FIG. 1A, the first housing portion 82 further comprises a plurality of first housing portion support cap fastener openings 96 formed in the first side 86a of the first housing portion 82. Each of the plurality of first housing portion support cap fastener openings 96 (see FIG. 1A) receive, or are configured to receive, the support cap fastener 66 (see FIGS. 1A-1C), such as in the form of bolt 66a (see FIGS. 1A-1C), or another suitable fastener. As shown in FIG. 1C, the first housing portion 82 further comprises a plurality of first housing portion housing fastener openings 97 formed in the second side 86b of the first housing portion 82. Each of the plurality of first housing portion housing fastener openings 97 (see FIG. 1C) receive, or are configured to receive, a housing fastener 110 (see FIGS. 1A-1D), such as in the form of a bolt 110a (see FIGS. 1A-1D), or another suitable fastener.

As shown in FIGS. 1A-1D, the first housing portion 82 further comprises base foot portions 98, in the form of first housing base foot portions 98a. Each base foot portion 98 has an attachment through opening 100 (see FIGS. 1A, 1C) to receive, or configured to receive, an attachment fastener (not shown) to attach the first housing portion 82 to the apparatus 200 (see FIGS. 6A, 7A, 8) that the shaft locking assembly 10 is used or installed in. As further shown in FIGS. 1A-1D, the first housing portion 82 further comprises a recessed slot opening 102 formed near the bottom of the first housing portion 82, and open on the second side 86b (see FIGS. 1A-1C) of the first housing portion 82.

The second housing portion 84 (see FIGS. 1A-1C) comprises a first side 104a (see FIGS. 1A-1C), a second side 104b (see FIGS. 1A-1C), a body 105 (see FIGS. 1A-1C) formed between the first side 104a and the second side 104b, and a central through opening 106 (see FIGS. 1A, 1C) formed through the body 105. As shown in FIGS. 1A and 1C, the second housing portion 84 further comprises a plurality of second housing portion housing fastener openings 108 formed through the body 105 of the second housing portion 84. Each of the plurality of second housing portion housing fastener openings 108 (see FIG. 1A) receive, or are configured to receive, the housing fastener 110 (see FIGS. 1A-1D), such as in the form of a bolt 110a (see FIGS. 1A-1D), or another suitable fastener.

As shown in FIGS. 1A-1D, the second housing portion 84 further comprises base foot portions 98, in the form of second housing base foot portions 98b. Each base foot portion 98 has an attachment through opening 100 (see FIGS. 1A, 1C, 1D) to receive, or configured to receive, an attachment fastener (not shown) to attach the second housing portion 84 to the apparatus 200 (see FIGS. 6A, 7A, 8) that the shaft locking assembly 10 is used or installed in.

When the retaining structure assembly 78, such as in the form of housing assembly 80, is assembled, the first housing portion 82 is joined to the second housing portion 84 with the plurality of housing fasteners 110 (see FIGS. 1A-1D), such as in the form of the plurality of bolts 110a (see FIGS. 1A-1D), and the second side 86b of the first housing portion 82 is adjacent and aligned with the first side 104a of the second housing portion 84.

As shown in FIGS. 1A-1D, in this version, the shaft locking assembly 10, such as shaft locking assembly 10a, comprises the rack and pinion design 111. The rack and pinion design 111 comprises a rack and pinion assembly 112 (see FIGS. 1A-1C) comprising a rack 114 (see FIGS. 1A-1D), such as in the form of a linear rack 114a (see FIGS. 1A-1D), and comprising a rotating element 115 (see FIGS. 1A-1C), such as in the form of a pinion 116 (see FIGS. 1A-1C), for example, a splined pinion 116a (see FIGS. 1A-1C). As shown in FIG. 1A, the rack 114, such as the linear rack 114a, comprises a first side 118a and a second side 118b. A plurality of rack teeth 120 (see FIGS. 1A, 1C, 1D) are formed on an exterior 122 (see FIG. 1A) of the first side 118a (see FIG. 1A). The splined pinion 116a is coupled to the rack 114, and the rack 114 is slidably disposed through the recessed slot opening 102 (see FIG. 1A) of the first housing portion 82, such that the rack 114 and the splined pinion 116a provide discrete locking positions 217 (see FIG. 8) for the shaft locking assembly 10, such as in the form of shaft locking assembly 10a.

The pinion 116 (see FIGS. 1A-1B), such as the splined pinion 116a (see FIGS. 1A, 1B), comprises a plurality of pinion teeth 124 (see FIGS. 1A-1B) formed on an exterior 126 (see FIG. 1A) of the pinion 116. The plurality of pinion teeth 124 of the pinion 116 preferably correspond to and mesh with the plurality of rack teeth 120 of the rack 114, when the shaft locking assembly 10, such as shaft locking assembly 10a, is assembled.

As shown in FIG. 1A, the pinion 116 (see FIGS. 1A-1B), such as the splined pinion 116a (see FIGS. 1A, 1B), further comprises an interior 128 with a central through opening 130, such as in the form of a splined central through opening 130a, having a plurality of interior splines 132. The pinion 116 (see FIGS. 1A, 2A), such as the splined pinion 116a (see FIGS. 1A, 2A), further comprises an inner diameter 134 (see FIG. 2A). The rotating element 115 (see FIG. 1A), such as the pinion 116 (see FIG. 1A), converts rotational motion 135 (see FIG. 8) into linear motion 136 (see FIG. 8). With the rack and pinion design 111 (see FIG. 1A), linear motion 136 may be controlled.

As shown in FIGS. 1A-1D, the shaft locking assembly 10, such as the shaft locking assembly 10a, further comprises a drive shaft 140. As shown in FIGS. 1A-1C, the shaft locking assembly 10, such as the shaft locking assembly 10a, may further comprise a retainer clip 138 for retaining a portion of the drive shaft 140 within the rotating element 115, such as the pinion 116, and within the central through opening 81 (see FIG. 2A) of the first housing portion 82 of the housing assembly 80.

The drive shaft 140 (see FIGS. 1A-1C) comprises a first end portion 142*a* (see FIGS. 1A-1C), a second end portion 142*b* (see FIGS. 1A-1C), an interior 144 (see FIG. 1A), and an exterior 146 (see FIG. 1B). As shown in FIG. 1A, the drive shaft 140 further comprises a central through opening 148, such as a splined central through opening 148*a*, having a plurality of interior splines 149. The splined portion 26 (see FIG. 1A) of the locking shaft 18 (see FIG. 1A) is disposed within, and preferably corresponds to, the splined central through opening 148*a* (see FIG. 1A) of the drive shaft 140 (see FIG. 1A), when the shaft locking assembly 10, such as the shaft locking assembly 10*a*, is assembled. The locking shaft 18 is preferably substantially slidably disposed within the splined central through opening 148*a* of the drive shaft 140.

The drive shaft 140 further comprises a drive end 150 (see FIGS. 1A-1D) with a drive opening 152 (see FIGS. 1C, 1D). In one version, the drive opening 152 (see FIGS. 1C, 1D) may comprise a square opening 152*a* (see FIGS. 1C, 1D). In another version, the drive opening 152 (see FIG. 3B) may comprise a hexagonal opening 152*b* (see FIG. 3B). The drive opening 152 may further comprise another suitable geometric shaped opening.

As shown in FIGS. 1A-1C, the drive shaft 140 further comprises a cylindrical body portion 154, such as a cylindrical splined body portion 154*a*, having a plurality of exterior splines 156. The cylindrical splined body portion 154*a* of the drive shaft 140 preferably corresponds to, and meshes with, the splined central through opening 130*a* of the splined pinion 116*a*, when the shaft locking assembly 10, such as shaft locking assembly 10*a*, is assembled. The rotating element 115 (see FIG. 1A) is disposed around, or is configured to be disposed around, an exterior portion 146*a* (see FIG. 1A) of the drive shaft 140 (see FIG. 1A) having the plurality of exterior splines 156 (see FIG. 1A). As shown in FIG. 1B, the drive shaft 140 further comprises an outer diameter 157 of the cylindrical body portion 154, such as a cylindrical splined body portion 154*a*. As further shown in FIG. 1B, the drive shaft 140, the pinion 116, the retainer clip 138, the housing assembly 80, the locking device 16, the spring element 70, and the support cap 46 are aligned along a longitudinal axis 178 of the shaft locking assembly 10.

Figure 2A:
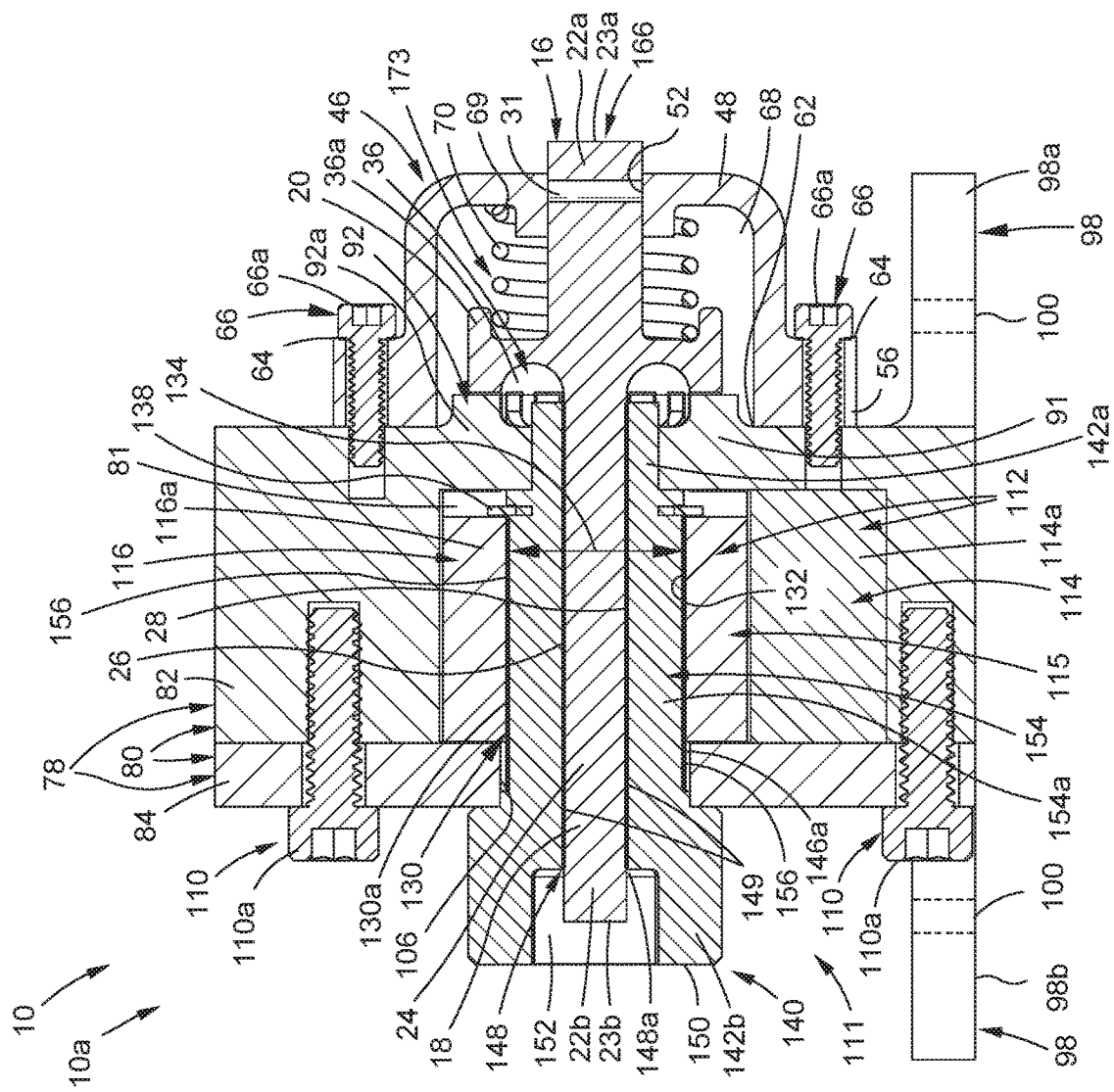
FIG. 2A is an illustration of a side cross-sectional view of a version of a shaft locking assembly having a rack and pinion design, and showing the shaft locking assembly assembled and in a locked position.
Figure 2B:
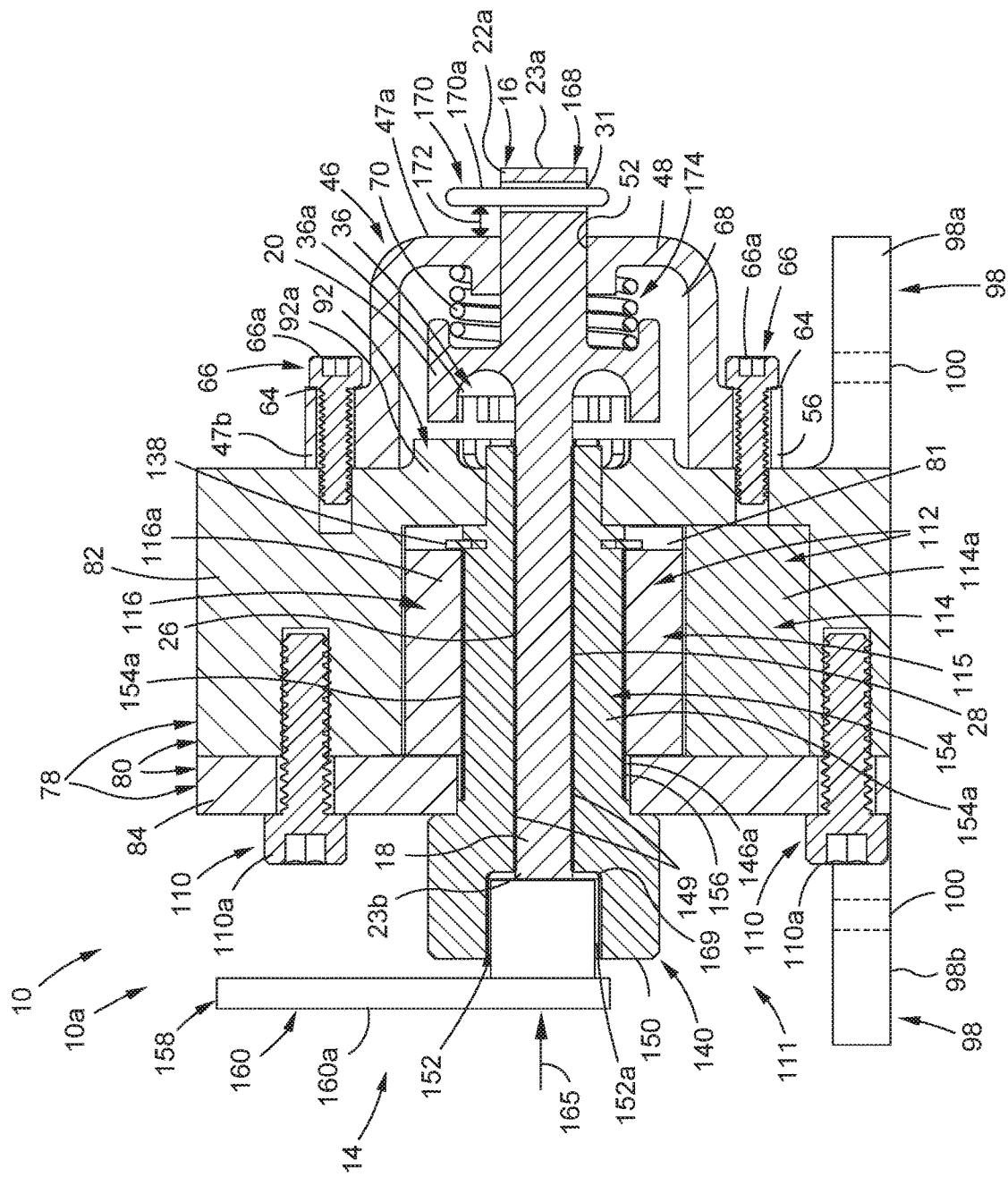
FIG. 2B is an illustration of a side cross-sectional view of the shaft locking assembly of FIG. 2A, and showing the shaft locking assembly assembled and in an unlocked position.

Now referring to FIGS. 2A-2B, FIG. 2A is an illustration of a side cross-sectional view of a version of the shaft locking assembly 10, such as the shaft locking assembly 10*a*, having the rack and pinion design 111 (see FIG. 1A), and showing the shaft locking assembly 10 assembled and in a locked position 166. FIG. 2B is an illustration of a side cross-sectional view of the shaft locking assembly 10, such as the shaft locking assembly 10*a*, of FIG. 2A, and showing the shaft locking assembly 10 assembled and in an unlocked position 168.

As shown in FIG. 2A, when the shaft locking assembly 10, such as the shaft locking assembly 10*a*, is in the locked position 166, the plurality of castellations 36, such as the plurality of notches 36*a*, on the castellated ring element 20, are engaged and interlocked with the plurality of projection members 92, such as the plurality of mating castellations 92*a*, on the side portion 91 of the first housing portion 82. As further shown in FIG. 2A, when the shaft locking assembly 10, such as the shaft locking assembly 10*a*, is in the locked position 166, the spring element 70 is in an expanded position 173, and the spring element 70 is positioned between and against the interior wall portion 69 of the support cap 46 and the castellated ring element 20.

FIGS. 2A-2B show the locking device 16 comprising the locking shaft 18 with the castellated ring element 20 disposed on the locking shaft 18. FIG. 2A further shows the first end portion 22*a* with the first end 23*a*, the second end portion 22*b* with the second end 23*b*, and the body 24, of the locking shaft 18. As shown in FIGS. 2A-2B, the splined portion 26 of the locking shaft 18, having the plurality of exterior splines 28, is disposed within, and corresponds to, the central through opening 148, such as in the form of the splined central through opening 148*a* (see FIG. 2A), of the drive shaft 140 (see FIG. 2A), having the plurality of interior splines 149.

As further shown in FIGS. 2A-2B, the support cap 46 comprised of the head portion 48 and the collar portion 56 is attached at the second end 47*b* (see FIG. 2B) to the first housing portion 82 of the housing assembly 80, with the plurality of support cap fasteners 66, such as in the form of the plurality of bolts 66*a*, each inserted through a support cap fastener through opening 64 in the support cap 46. The central through opening 62 (see FIG. 2A) of the support cap 46 (see FIGS. 2A-2B) is adjacent the first housing portion 82 (see FIG. 2A), and the hollow interior portion 68 (see FIGS. 2A-2B) of the support cap 46 contains or holds the castellated ring element 20 (see FIGS. 2A-2B), the spring element 70 (see FIGS. 2A-2B), and a portion of the locking shaft 18 (see FIG. 2A). As shown in FIGS. 2A-2B, the first end portion 22*a* of the locking shaft 18 is inserted through the central opening 52 of the support cap 46.

As further shown in FIGS. 2A-2B, the first housing portion 82 and the second housing portion 84, of the retaining structure assembly 78, such as in the form of housing assembly 80, are attached together with the plurality of housing fasteners 110, such as in the form of the plurality of bolts 110*a*. FIGS. 2A-2B further show the base foot portions 98, such as the first housing base foot portion 98*a* and the second housing base foot portion 98*b*, and the attachment through openings 100 in the base foot portions 98, each attachment through opening 100 configured to receive an attachment fastener (not shown).

As shown in FIGS. 2A-2B, the retaining structure assembly 78, such as in the form of housing assembly 80, retains the locking device 16, the drive shaft 140, and the rotating element 115, such as the pinion 116, in the form of splined pinion 116*a*, in the housing assembly 80. In particular, the housing assembly 80 retains the pinion 116, such as the splined pinion 116*a*, the splined portion 26 of the locking shaft 18, and the cylindrical body portion 154, such as the cylindrical splined body portion 154*a*, of the drive shaft 140, in the central through opening 81 the housing assembly 80. FIG. 2A further shows the first end portion 142*a* and the cylindrical splined body portion 154*a* of the drive shaft 140 retained in the first housing portion 82, and a portion of the cylindrical splined body portion 154*a* inserted through, and retained in, the central through opening 106 of the second housing portion 84. FIG. 2A further shows the second end portion 142*b* of the drive shaft 140 disposed outside of the housing assembly 80 and adjacent the second housing portion 84. FIGS. 2A-2B show the drive end 150 of the drive shaft 140, with the drive opening 152, such as in the form of square opening 152*a* (see FIG. 2B). FIGS. 2A-2B further show the retainer clip 138 adjacent the pinion 116, such as the splined pinion 116*a*, and retaining a portion of the cylindrical body portion 154, such as the cylindrical splined body portion 154*a*, of the drive shaft 140.

FIGS. 2A-2B further show the rack and pinion assembly 112 comprising the rotating element 115, such as in the form of the pinion 116, for example, the splined pinion 116a, coupled to the rack 114, such as the linear rack 114a. As further shown in FIGS. 2A-2B, the cylindrical splined body portion 154a of the drive shaft 140, having the plurality of exterior splines 156, is disposed within, and corresponds to, the central through opening 130 (see FIG. 2A), such as in the form of the splined central through opening 130a (see FIG. 2A), of the rotating element 115, such as the splined pinion 116a, having the plurality of interior splines 132 (see FIG. 2A). The rotating element 115 (see FIGS. 2A-2B), such as the pinion 116 (see FIGS. 2A-2B), for example, the splined pinion 116a (see FIGS. 2A-2B), is disposed around, or is configured to be disposed around, the exterior portion 146a (see FIGS. 2A-2B) of the drive shaft 140 (see FIGS. 2A-2B) having the plurality of exterior splines 156 (see FIGS. 2A-2B).

FIG. 2A further shows the inner diameter 134 of the pinion 116. The inner diameter 134 of the pinion 116 is preferably slightly larger than, or greater than, the outer diameter 157 (see FIG. 1B) of the cylindrical body portion 154, such as the cylindrical splined body portion 154a, of the drive shaft 140.

As shown in FIG. 2B, when the shaft locking assembly 10, such as the shaft locking assembly 10a, is in the unlocked position 168, the plurality of castellations 36, such as the plurality of notches 36a, on the castellated ring element 20, are disengaged and separated from with the plurality of projection members 92, such as the plurality of mating castellations 92a, on the side portion 91 of the first housing portion 82. As further shown in FIG. 2B, when the shaft locking assembly 10, such as the shaft locking assembly 10a, is in the unlocked position 168, the spring element 70 is in a compressed position 174. The spring element 70 provides a spring force 76 (see FIG. 8) to the castellated ring element 20.

FIG. 2B shows a shaft locking system 14 comprising the shaft locking assembly 10, such as the shaft locking assembly 10a, a shaft engagement device 158, and a holding element 170. The shaft engagement device 158 provides and functions as a driving or enabling component for the shaft locking assembly 10. As shown in FIG. 2B, in one version, the shaft engagement device 158 comprises an actuation tool 160, such as in the form of a square driver 160a. As shown in FIG. 2B, the shaft engagement device 158, such as the actuation tool 160, for example, the square driver 160a, engages the drive end 150 of the drive shaft 140 and is inserted into the drive opening 152, such as the square opening 152a. As further shown in FIG. 2B, the shaft engagement device 158, such as the actuation tool 160, for example, the square driver 160a, engages the second end 23b of the locking shaft 18 in an engagement position 169. The shaft engagement device 158, such as the actuation tool 160, for example, the square driver 160a, actuates, or is configured to actuate or push, the second end 23b of the locking shaft 18 in an actuation push direction 165, so that the locking shaft 18 moves, and the plurality of castellations 36 are disengaged from, and move away from, the plurality of projection members 92, and the shaft locking assembly 10 moves from the locked position 166 (see FIG. 2A) to the unlocked position 168 (see FIG. 2B). When the locking shaft 18 moves toward the spring element 70, the spring element 70 moves from the expanded position 173 (see FIG. 2A) to the compressed position 174 (see FIG. 2B).

As shown in FIG. 2B, the shaft locking system 14 further comprises the holding element 170, such as in the form of a cotter pin 170a. However, the holding element 170 may also comprise a clip 170b (see FIG. 8), or another suitable holding element 170 or device. To hold the locking shaft 18 out, so that the apparatus 200 (see FIGS. 6A, 8) with the shaft locking assembly 10 may move in a free motion 234 (see FIG. 8), the holding element 170 (see FIG. 2B) is preferably inserted into the through opening 31 (see FIG. 2B) formed through the first end portion 22a (see FIG. 2B) of the locking shaft 18 (see FIG. 2B). As shown in FIG. 2B, the holding element 170 holds the first end portion 22a at an outward distance 172 away from the first end 47a of the support cap 46.

Figure 8:
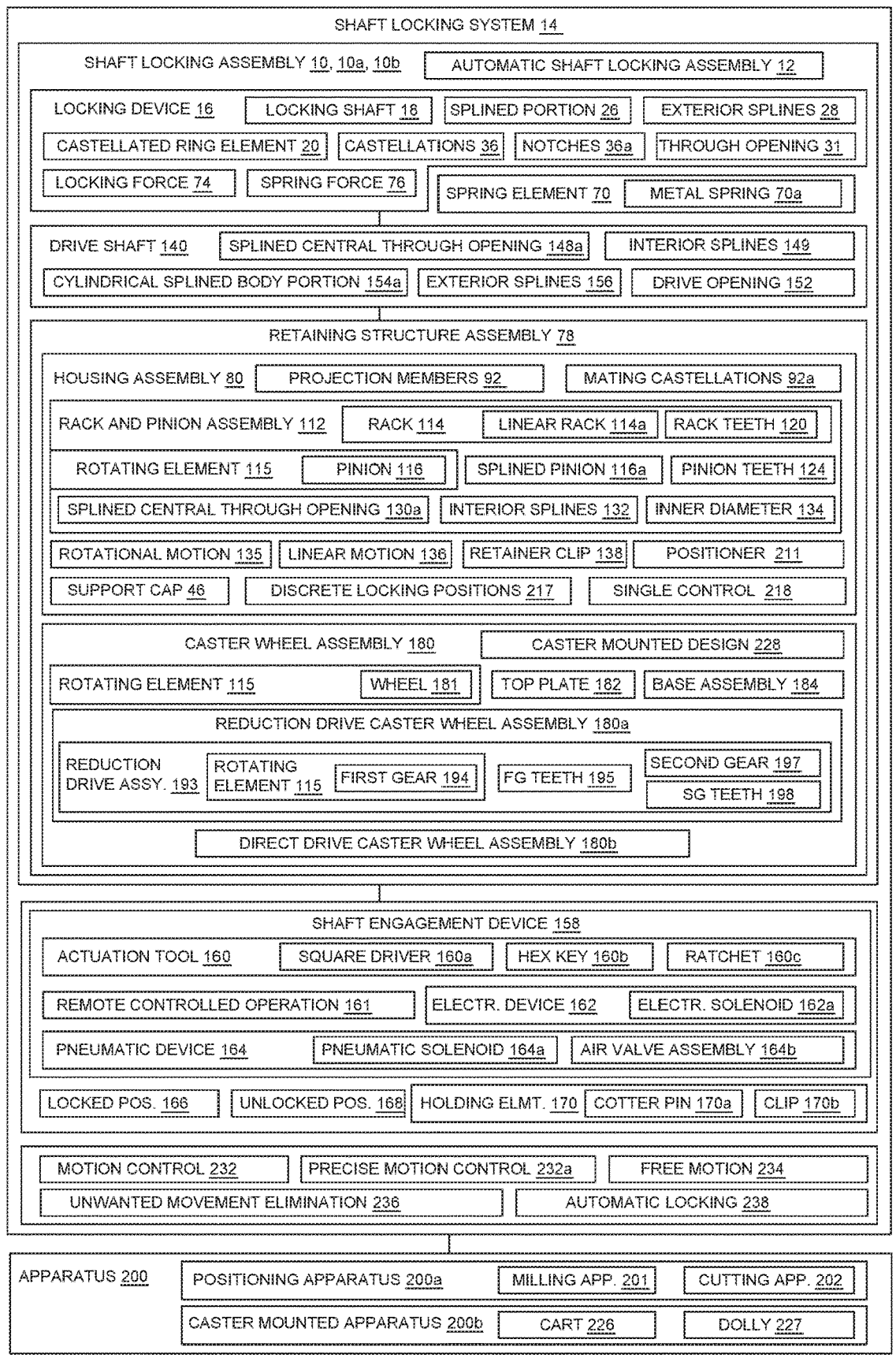
FIG. 8 is an illustration of a functional block diagram showing exemplary versions of a shaft locking system and shaft locking assembly of the disclosure.

The shaft engagement device 158, such as the actuation tool 160 (see FIG. 2B) may be manually rotated, which in turn, rotates the drive shaft 140 (see FIG. 2B), and the rotating drive shaft 140 rotates the locking shaft 18 (see FIG. 2B) and the rotating element 115 (see FIG. 2B), such as the pinion 116 (see FIG. 2B), to provide motion control 232 (see FIG. 8) and unwanted movement elimination 236 (see FIG. 8) of the apparatus 200 (see FIGS. 6A, 8).

Alternatively, the shaft engagement device 158 may be operated in a remote controlled operation 161 (see FIG. 8), and the shaft engagement device 158 may comprise an electronic device 162 (see FIG. 8), such as an electronic solenoid 162a (see FIG. 8), a pneumatic device 164 (see FIG. 8), such as a pneumatic solenoid 164a (see FIG. 8), or an air valve assembly 164b (see FIG. 8), or another suitable shaft engagement device 158.

Figure 3B:
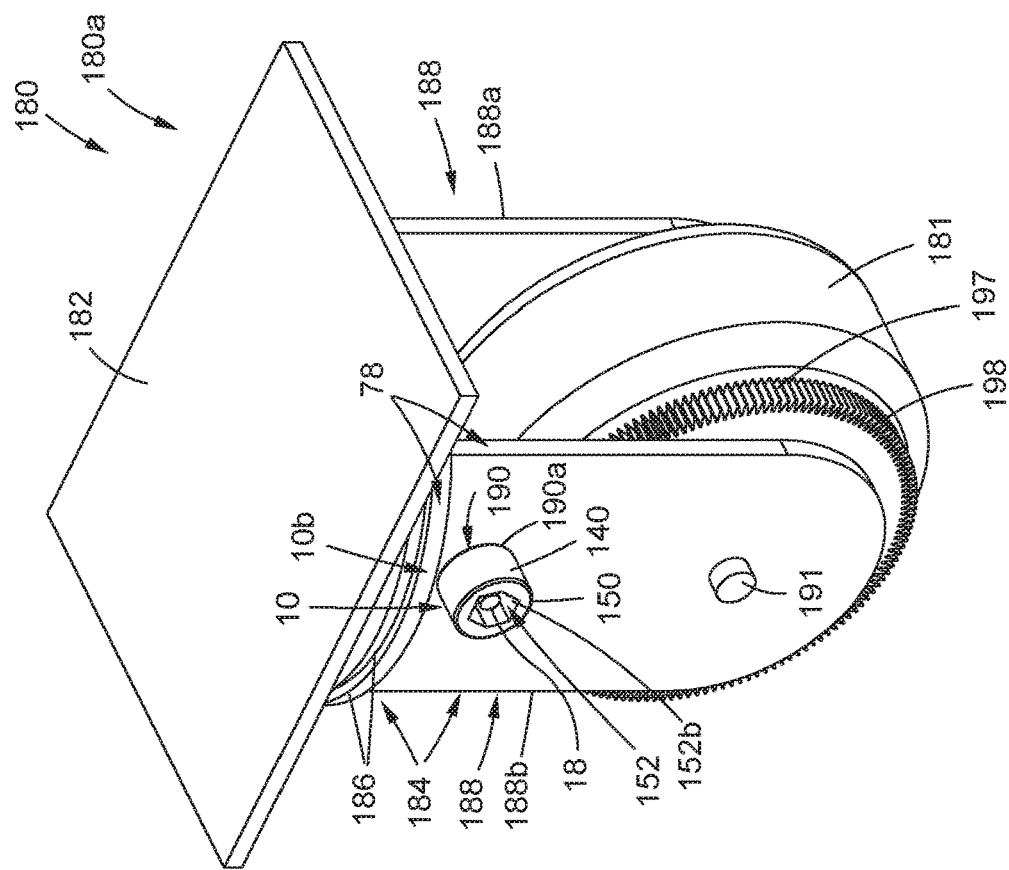
FIG. 3B is an illustration of a back perspective view of the shaft locking assembly of FIG. 3A.
Figure 3A:
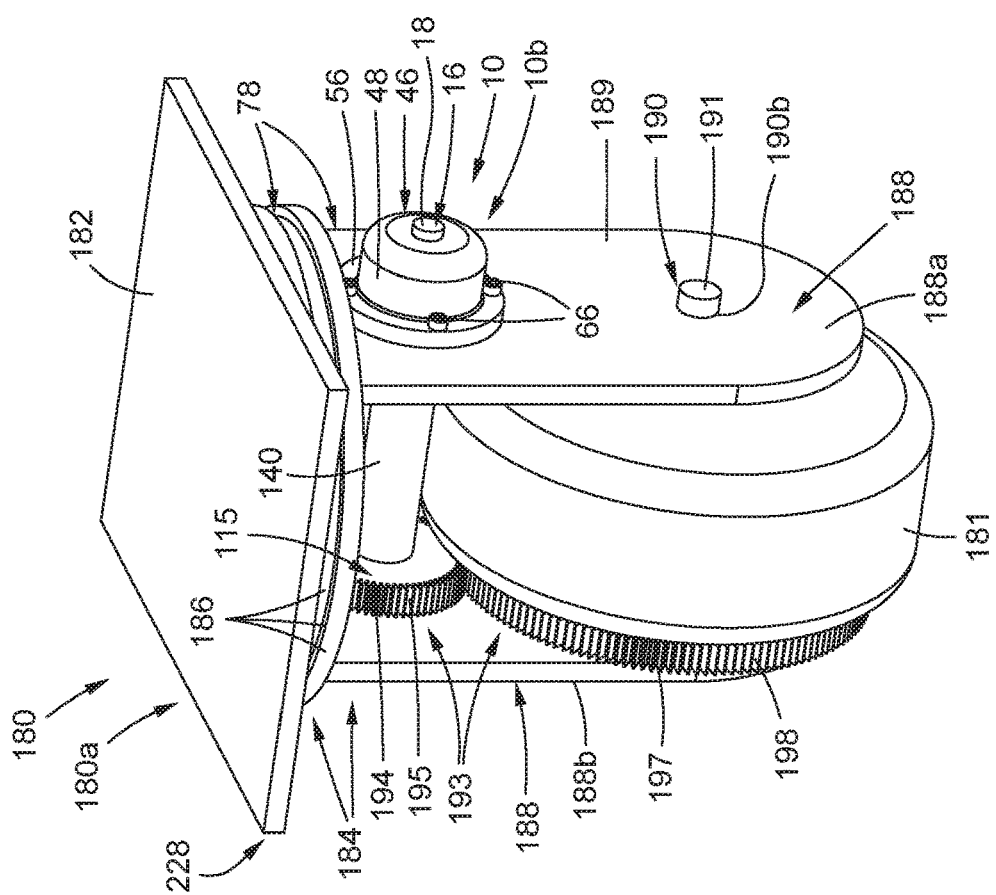
FIG. 3A is an illustration of a front perspective view of another version of a shaft locking assembly of the disclosure, where the shaft locking assembly has a caster mounted design with a reduction drive caster wheel assembly.
Figure 3C:
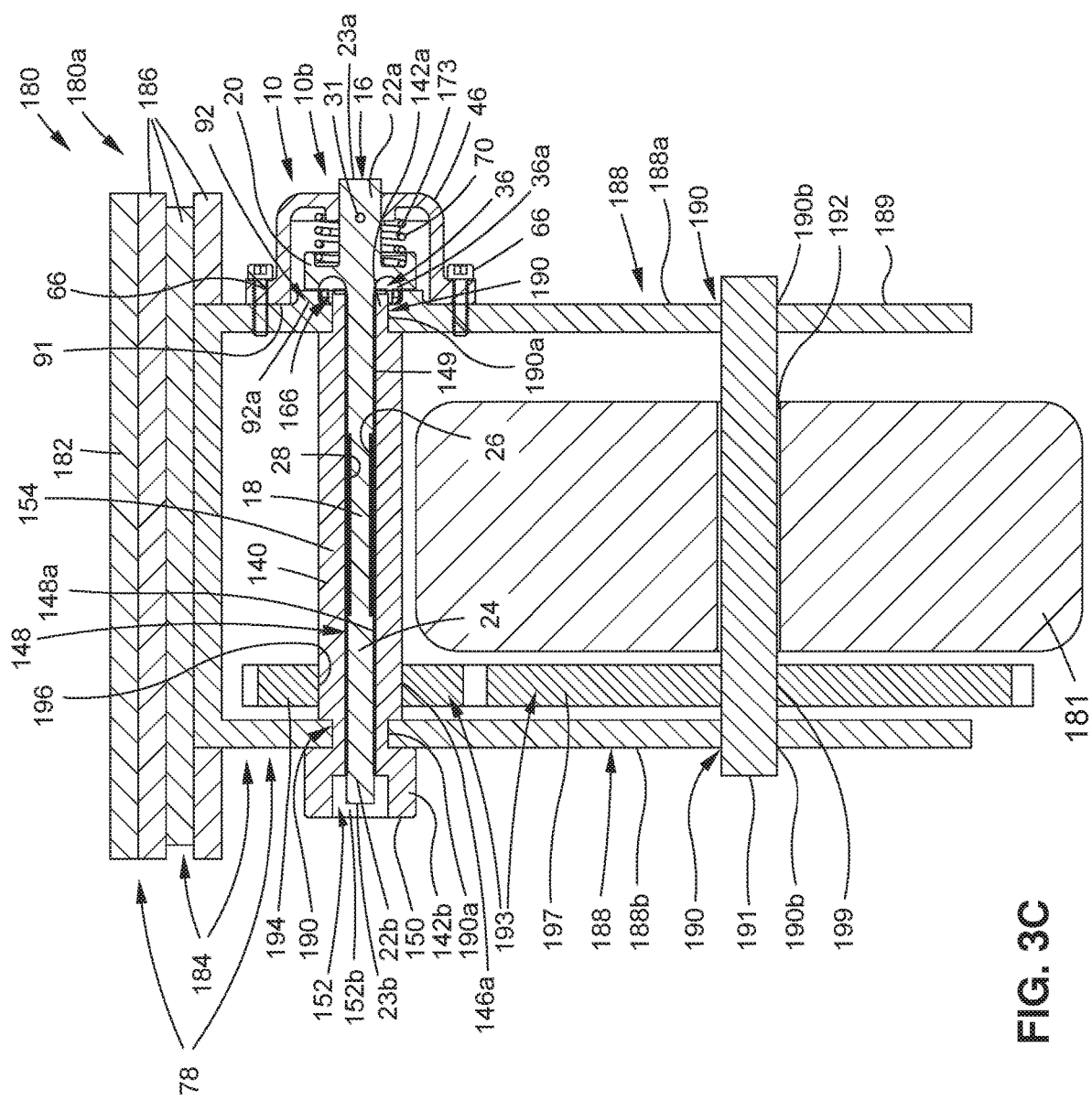
FIG. 3C is an illustration of a side cross-sectional view of the shaft locking assembly of FIG. 3A, and showing the shaft locking assembly in a locked position.

Now referring to FIGS. 3A-3C, 3A-3C show another version of the shaft locking assembly 10, such as in the form of a shaft locking assembly 10b, of the disclosure. FIG. 3A is an illustration of a front perspective view of another version of the shaft locking assembly 10, such as the shaft locking assembly 10b, of the disclosure, where the shaft locking assembly 10 has a caster mounted design 228 with a reduction drive caster wheel assembly 180a. FIG. 3B is an illustration of a back perspective view of the shaft locking assembly 10, such as the shaft locking assembly 10b, of FIG. 3A. FIG. 3C is an illustration of a side cross-sectional view of the shaft locking assembly 10, such as the shaft locking assembly 10b, of FIG. 3A, and showing the shaft locking assembly 10 in a locked position 166.

FIGS. 3A-3C show the shaft locking assembly 10, such as in the form of the shaft locking assembly 10b, having the caster mounted design 228 (see FIG. 3A) with a caster wheel assembly 180 comprising a reduction drive caster wheel assembly 180a. In another version, as shown in FIGS. 3A-3C, the retaining structure assembly 78 comprises a base assembly 184 of the caster wheel assembly 180. As shown in FIGS. 3A-3C, the base assembly 184 comprises one or more support plates 186 coupled to a top plate 182 and coupled to yoke portions 188, including a first yoke portion 188a and a second yoke portion 188b. As further shown in FIGS. 3A-3C, each yoke portion 188 has openings 190, including a first opening 190a (see FIGS. 3B, 3C) and a second opening 190b (see FIGS. 3A, 3C). The first opening 190a in each yoke portion 188 receives, or is configured to receive, the drive shaft 140 (see FIGS. 3A-3C) of the shaft locking assembly 10b. The second opening 190b formed in each yoke portion 188 receives, or is configured to receive, a wheel axle 191 (see FIGS. 3A-3C) coupled to a wheel 181 (see FIGS. 3A-3C) and inserted through a central through opening 192 (see FIG. 3C) of the wheel 181.

The reduction drive caster wheel assembly 180a comprises a reduction drive assembly 193 (see FIGS. 3A, 3C). The reduction drive assembly 193 (see FIGS. 3A, 3C) comprises a first gear 194 (see FIGS. 3A, 3C) having a plurality of first gear teeth 195 (see FIG. 3A) coupled to a second gear 197 (see FIGS. 3A-3C) having a plurality of second gear teeth 198 (see FIGS. 3A-3B). In this geared drive version, the rotating element 115 (see FIG. 3A) comprises the first gear 194 (see FIG. 3A) disposed around the exterior portion 146*a* (see FIG. 3C) of the drive shaft 140 (see FIG. 3C). As shown in FIG. 3A, the plurality of first gear teeth 195 of the first gear 194 are coupled to, and mesh with, the plurality of second gear teeth 198 of the second gear 197, to provide a reduction drive to allow precise motion control 232*a* (see FIG. 8) to a caster mounted apparatus 200*b* (see FIGS. 7A, 8). With the caster wheel assembly 180 comprising the reduction drive caster wheel assembly 180*a*, the rotating element 115 comprises the first gear 194 coupled between the first yoke portion 188*a* and the second yoke portion 188*b*, and the first gear 194 is further coupled to the second gear 197 to form the reduction drive assembly 193.

FIG. 3A shows the locking shaft 18 of the locking device 16, protruding from the head portion 48 of the support cap 46. FIG. 3A further shows the collar portion 56 of the support cap 46 attached to an exterior 189 of the first yoke portion 188*a*, with support cap fasteners 66. FIG. 3A further shows the drive shaft 140 coupled to the first gear 194, coupled between the yoke portions 188, and positioned above the wheel 181.

FIG. 3B shows the drive end 150 of the drive shaft 140 of the shaft locking assembly 10, such as the shaft locking assembly 10*b*, coupled to the second yoke portion 188*b*. FIG. 3B further shows the drive opening 152 of the drive shaft 140 comprising a hexagonal opening 152*b* and shows the locking shaft 18 within the drive opening 152.

FIG. 3C shows the shaft locking assembly 10, such as the shaft locking assembly 10*b*, in the locked position 166 with the plurality of castellations 36, such as the plurality of notches 36*a*, on the castellated ring element 20, engaged and interlocked with the plurality of projection members 92, such as the plurality of mating castellations 92*a*, on the side portion 91 of the retaining structure assembly 78 comprising the yoke portion 188, such as in the form of first yoke portion 188*a*. As further shown in FIG. 3C, when the shaft locking assembly 10, such as shaft locking assembly 10*b*, is in the locked position 166, the spring element 70 is in the expanded position 173 and is positioned between the support cap 46 and the castellated ring element 20.

FIG. 3C further shows the support cap 46 attached to the exterior 189 of the first yoke portion 188*a*, with support cap fasteners 66. FIG. 3C further shows the locking shaft 18 of the locking device 16 with the first end portion 22*a* having the first end 23*a* protruding out of the support cap 46. FIG. 3C further shows the through opening 31 in the first end portion 22*a* of the locking shaft 18, shows the body 24 of the locking shaft 18, and shows the second end portion 22*b* with the second end 23*b* of the locking shaft 18. FIG. 3C further shows the splined portion 26 of the locking shaft 18, having the plurality of exterior splines 28, disposed within, and corresponding to, the central through opening 148, such as in the form of the splined central through opening 148*a*, of the drive shaft 140, having the plurality of interior splines 149.

FIG. 3C further shows the first end portion 142*a* of the drive shaft 140 inserted through the opening 190, such as the first opening 190*a*, in the first yoke portion 188*a*. FIG. 3C further shows the cylindrical body portion 154 of the drive shaft 140 inserted through a central through opening 196 of the first gear 194 and inserted through the opening 190, such as the first opening 190*a*, in the second yoke portion 188*b*.

FIG. 3C further shows the second end portion 142*b* of the drive shaft 140 positioned at the exterior of the second yoke portion 188*b*. The second end portion 142*b* (see FIG. 3C) includes the drive end 150 (see FIG. 3C) with the drive opening 152 (see FIG. 3C), such as in the form of hexagonal opening 152*b* (see FIG. 3C). FIG. 3C further shows a central through opening 199 of the second gear 197 through which the wheel axle 191 of the wheel 181 is inserted.

Figure 4B:
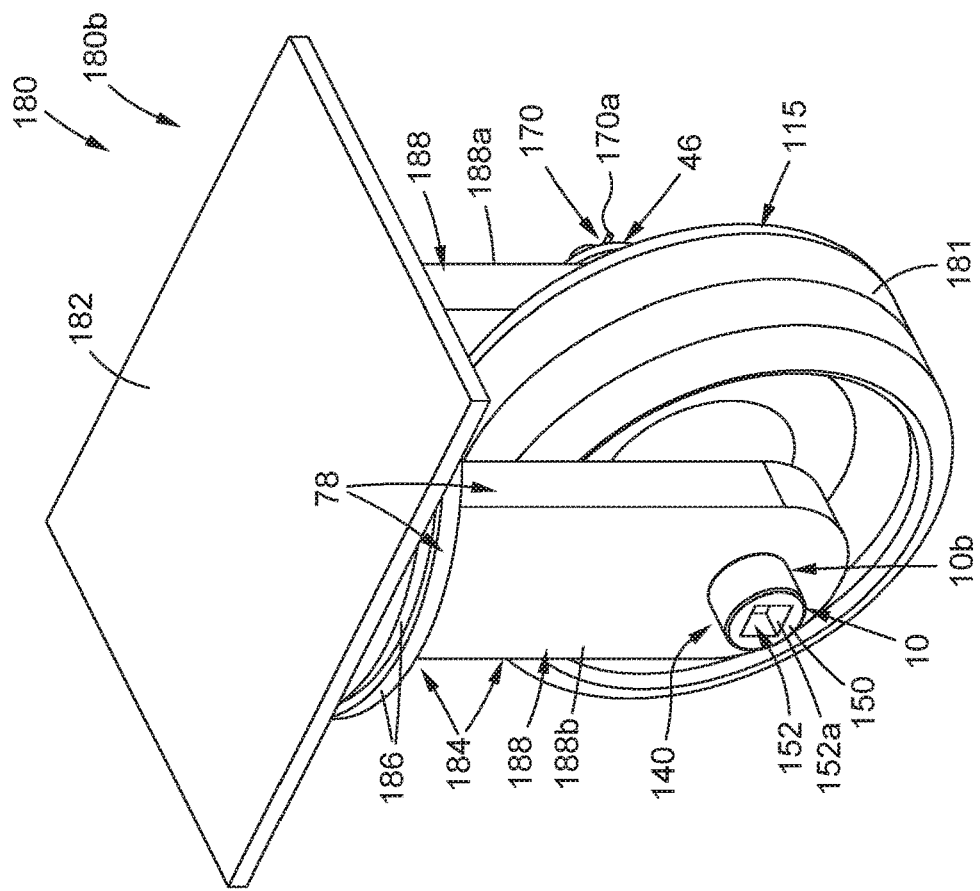
FIG. 4B is an illustration of a back perspective view of the shaft locking assembly of FIG. 4A.
Figure 4A:
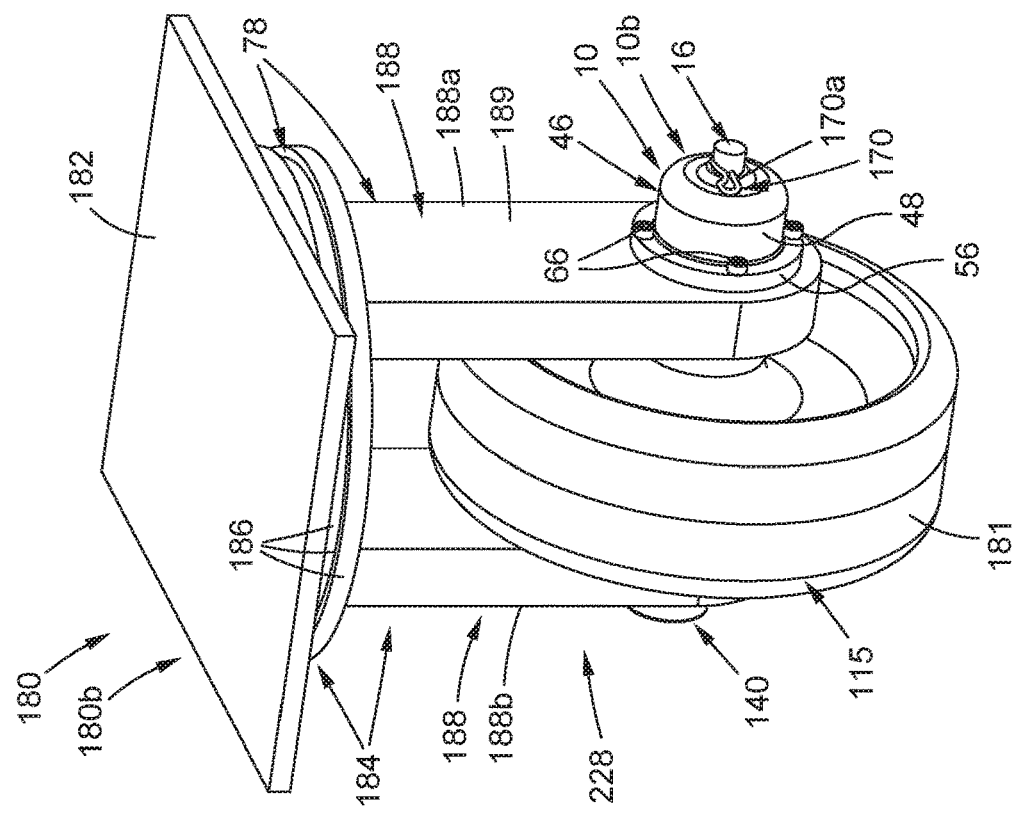
FIG. 4A is an illustration of a front perspective view of another version of a shaft locking assembly of the disclosure, where the shaft locking assembly has a caster mounted design with a direct drive caster wheel assembly.
Figure 4C:
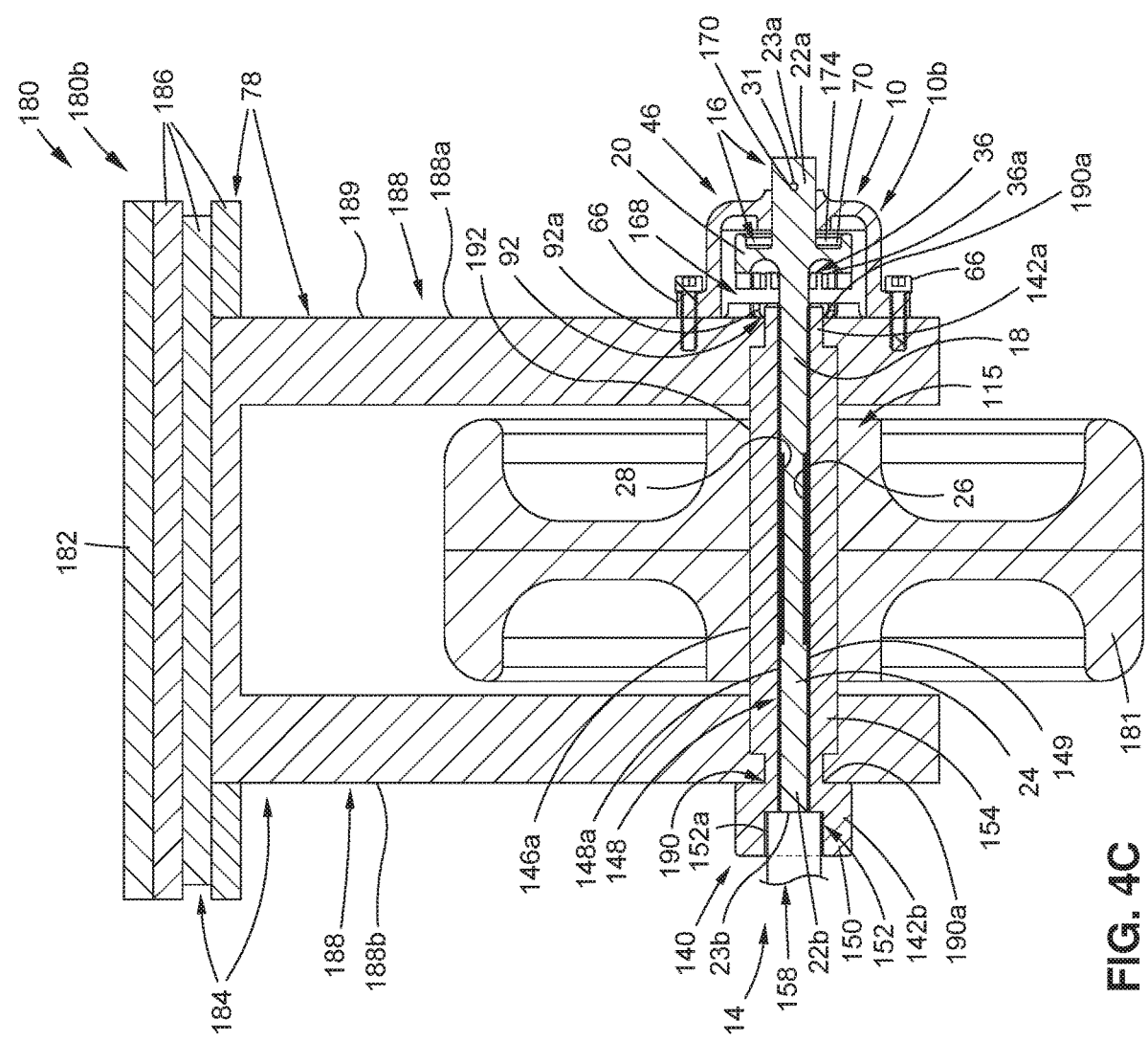
FIG. 4C is an illustration of a side cross-sectional view of the shaft locking assembly of FIG. 4A, and showing the shaft locking assembly in an unlocked position.

Now referring to FIGS. 4A-4C, 4A-4C show another version of the shaft locking assembly 10, such as the shaft locking assembly 10*b*, of the disclosure, where the shaft locking assembly 10 has a caster mounted design 228 with a direct drive caster wheel assembly 180*b*. FIG. 4A is an illustration of a front perspective view of another version of the shaft locking assembly 10, such as the shaft locking assembly 10*b*, of the disclosure, where the shaft locking assembly 10 has the caster mounted design 228 with the direct drive caster wheel assembly 180*b*. FIG. 4B is an illustration of a back perspective view of the shaft locking assembly 10, such as the shaft locking assembly 10*b*, of FIG. 4A. FIG. 4C is an illustration of a side cross-sectional view of the shaft locking assembly 10, such as the shaft locking assembly 10*b*, of FIG. 4A, and showing the shaft locking assembly 10 in the unlocked position 168.

FIGS. 4A-4C show the shaft locking assembly 10, such as in the form of the shaft locking assembly 10*b*, having the caster mounted design 228 (see FIG. 4A) with the caster wheel assembly 180 comprising the direct drive caster wheel assembly 180*b*. In this version, as shown in FIGS. 4A-4C, the retaining structure assembly 78 comprises the base assembly 184 of the caster wheel assembly 180. As shown in FIGS. 4A-4C, the base assembly 184 comprises one or more support plates 186 coupled to the top plate 182 and coupled to yoke portions 188, including the first yoke portion 188*a* and the second yoke portion 188*b*. As further shown in FIG. 4C, each yoke portion 188 has an opening 190, including a first opening 190*a*. The first opening 190*a* in each yoke portion 188 receives, or is configured to receive, the drive shaft 140 (see FIGS. 3B-3C) of the shaft locking assembly 10*b*.

The direct drive caster wheel assembly 180*b* (see FIGS. 4A-4C) comprises the wheel 181 (see FIGS. 4A-4C). In this version, the rotating element 115 (see FIGS. 4A-4C) comprises the wheel 181. The drive shaft 140 (see FIGS. 4A-4C) and the locking shaft 18 (see FIG. 4C) of the shaft locking assembly 10 (see FIGS. 4A-4C), such as the shaft locking assembly 10*b* (see FIGS. 4A-4C), are preferably coupled through the central through opening 192 (see FIG. 3C) of the wheel 181, to function as a wheel axle 191 (see FIG. 3C). The direct drive allows for precise motion control 232*a* (see FIG. 8) to a caster mounted apparatus 200*b* (see FIGS. 7A, 8).

FIG. 4A shows the locking device 16 being held out with the holding element 170, such as a cotter pin 170*a*, and protruding from the head portion 48 of the support cap 46. FIG. 4A further shows the collar portion 56 of the support cap 46 attached to the exterior 189 of the first yoke portion 188*a*, with support cap fasteners 66. FIG. 4A further shows the drive shaft 140 coupled and positioned through the wheel 181, instead of above the wheel 181 as om FIG. 3A.

FIG. 4B shows the drive end 150 of the drive shaft 140 coupled to the second yoke portion 188*b*. FIG. 4B further shows the drive opening 152 of the drive shaft 140 comprising a square opening 152*a*. FIG. 4B further shows the support cap 46 and the holding element 170, such as the cotter pin 170*a*.

FIG. 4C shows the shaft locking system 14 comprising the shaft locking assembly 10, such as the shaft locking assembly 10b, the shaft engagement device 158, and the holding element 170. The shaft engagement device 158 (see FIG. 4C) may comprise the actuation tool 160 (see FIG. 2B) that may be manually rotated, which in turn, rotates the drive shaft 140 (see FIG. 4C), which rotates the locking shaft 18 (see FIG. 4C) and the rotating element 115 (see FIG. 4C), such as the wheel 181 (see FIG. 4C), to provide motion control 232 (see FIG. 8) and unwanted movement elimination 236 (see FIG. 8) of an apparatus 200 (see FIGS. 7A, 8). Alternatively, the shaft engagement device 158 (see FIG. 4C) may be operated in a remote controlled operation 161 (see FIG. 8), and the shaft engagement device 158 may comprise an electronic device 162 (see FIG. 8), such as an electronic solenoid 162a (see FIG. 8), a pneumatic device 164 (see FIG. 8), such as a pneumatic solenoid 164a (see FIG. 8), or an air valve assembly 164b (see FIG. 8), or another suitable shaft engagement device 158.

FIG. 4C further shows the shaft locking assembly 10, such as the shaft locking assembly 10b, in the unlocked position 168 with the plurality of castellations 36, such as the plurality of notches 36a, on the castellated ring element 20, disengaged and separated from the plurality of projection members 92, such as the plurality of mating castellations 92a, on the retaining structure assembly 78 comprising the yoke portion 188, such as in the form of first yoke portion 188a. As further shown in FIG. 4C, when the shaft locking assembly 10, such as the shaft locking assembly 10b, is in the unlocked position 168, the spring element 70 is in the compressed position 174 and is positioned between the support cap 46 and the castellated ring element 20.

FIG. 4C further shows the support cap 46 attached to the first yoke portion 188a, with support cap fasteners 66. FIG. 4C further shows the locking shaft 18 of the locking device 16 with the first end portion 22a having the first end 23a protruding out of the support cap 46. FIG. 4C further shows the through opening 31 in the first end portion 22a of the locking shaft 18 with the holding element 170 inserted through the through opening 31. FIG. 4C further shows the body 24 of the locking shaft 18, and shows the second end portion 22b with the second end 23b of the locking shaft 18 in contact with, and being actuated by, the shaft engagement device 158.

FIG. 4C further shows the splined portion 26 of the locking shaft 18, having the plurality of exterior splines 28, disposed within, and corresponding to, the central through opening 148, such as in the form of the splined central through opening 148a, of the drive shaft 140, having the plurality of interior splines 149. FIG. 4C further shows the first end portion 142a of the drive shaft 140 inserted through the first opening 190a, in the first yoke portion 188a. FIG. 4C further shows the cylindrical body portion 154 of the drive shaft 140 inserted through a central through opening 192 of the wheel 181 and inserted through the opening 190, such as the first opening 190a, in the second yoke portion 188b. The locking shaft 18 (see FIG. 4C) and the drive shaft 140 (see FIG. 4C) are inserted through the central through opening 192 (see FIG. 4C) of the wheel 181 (see FIG. 4C), and preferably function as a wheel axle 191 (see FIG. 3C).

FIG. 4C further shows the second end portion 142b of the drive shaft 140 positioned at the exterior of the second yoke portion 188b. The second end portion 142b (see FIG. 4C) includes the drive end 150 (see FIG. 4C) with the drive opening 152 (see FIG. 4C), such as in the form of square opening 152a (see FIG. 4C).

Now referring to FIGS. 5A-5B, FIG. 5A is an illustration of an enlarged front perspective view of the shaft locking assembly 10, such as the shaft locking assembly 10b, having the caster mounted design 228 with the direct drive caster wheel assembly 180b, and showing the holding element 170 holding the locking shaft 18 in an outward direction 176. FIG. 5B is an illustration of an enlarged front perspective view of circle 5B of FIG. 5A, showing the shaft locking assembly 10, such as shaft locking assembly 10b, in the unlocked position 168.

FIG. 5A shows the caster wheel assembly 180, such as in the form of direct drive caster wheel assembly 180b, comprising the rotating element 115 in the form of the wheel 181 (see also FIG. 5B). FIG. 5A further shows the retaining structure assembly 78 comprising the yoke portions 188, including the first yoke portion 188a and the second yoke portion 188b.

FIG. 5A shows the holding element 170, such as the cotter pin 170a, attached to the shaft locking assembly 10, such as the shaft locking assembly 10b, to hold the locking shaft 18 (see FIG. 5B) at an outward distance 172 in an outward direction 176. FIG. 5A further shows the support cap 46 with the head portion 48 and the collar portion 56, and shows the collar portion 56 attached to the exterior 189 of the first yoke portion 188a, with support cap fasteners 66.

FIG. 5B shows the first end portion 22a of the locking shaft 18 of the locking device 16 being held out at an outward distance 172 with the holding element 170, such as the cotter pin 170a. FIG. 5B further shows the first end portion 22a with the first end 23a of the locking shaft 18 protruding through the central opening 52 of the head portion 48 of the support cap 46, and shows the through opening 31 formed through the first end portion 22a with the holding element 170 inserted through the through opening 31. FIG. 5B further shows the collar portion 56 of the support cap 46 attached to the exterior 189 of the yoke portion 188, such as the first yoke portion 188a, with support cap fasteners 66.

FIG. 5B further shows the shaft locking assembly 10, such as the shaft locking assembly 10b, in the unlocked position 168 with the plurality of castellations 36, such as the plurality of notches 36a, on the end 34, such as the second end 34b, of the castellated ring element 20, disengaged and separated from the plurality of projection members 92, such as the plurality of mating castellations 92a, on the side portion 91 of the retaining structure assembly 78 comprising the yoke portion 188, such as in the form of first yoke portion 188a. The plurality of projection members 92, such as the plurality of mating castellations 92a are fixedly attached and protrude from the exterior 189 of first yoke portion 188a.

FIG. 5B further shows the end 34, such as the first end 34a, of the castellated ring element 20 facing toward the central opening 52 (see FIG. 1A) of the support cap 46 and facing toward the holding element 170. FIG. 5B further shows the castellated ring element 20 contained within the hollow interior portion 68 of the support cap 46.

Now referring to FIGS. 6A-6B, FIG. 6A is an illustration of a front perspective view of a version of a shaft locking assembly 10, such as the shaft locking assembly 10a, of the disclosure, where the shaft locking assembly 10 is used in a positioning apparatus 200a, and FIG. 6B is an illustration of a front view of the shaft locking assembly 10 and the positioning apparatus 200a of FIG. 6A. As shown in FIGS. 6A-6B, the shaft locking assembly 10, such as in the form of shaft locking assembly 10a, is used in an apparatus 200, such as positioning apparatus 200a, for example, in the form of a cutting apparatus 202, such as a table saw 202a.

As further shown in FIGS. 6A-6B, the positioning apparatus 200a, such as the cutting apparatus 202, in form of table saw 202a, comprises a saw blade 204 disposed in a portion 208 of a table 206, and a fence 210 attached to the table 206. As further shown in FIGS. 6A-6B, the shaft locking assembly 10, such as in the form of the shaft locking assembly 10a, functions as a positioner 211, for example, to position the saw blade 204 relative to the fence 210, or to position the fence 210.

As further shown in FIGS. 6A-6B, the shaft locking assembly 10, such as in the form of the shaft locking assembly 10a, is attached to the apparatus 200, such as the cutting apparatus 202, in the form of table saw 202a, via attachment members 214, and is attached to the portion 208 of the table 206, via a support member 216. FIGS. 6A-6B show the shaft locking assembly 10, such as in the form of the shaft locking assembly 10a, with the locking device 16 (see FIG. 6B), the retaining structure assembly 78 (see FIG. 6B) in the form of housing assembly 80 with housing fasteners 110 (see FIG. 6B), the drive shaft 140 with the drive opening 152 (see FIG. 6B), and the rack 114. The shaft locking assembly 10, such as in the form of the shaft locking assembly 10a, shown in FIGS. 6A-6B, has the rack and pinion design 111 (see FIG. 6B). As shown in FIG. 6B, the shaft locking assembly 10, such as in the form of the shaft locking assembly 10a, may position and move the saw blade 204 and the portion 208 of the table 206 in a positioning direction 212, such as a first direction 212a, or a second direction 212b opposite the first direction 212a.

The shaft locking assembly 10, such as in the form of the shaft locking assembly 10a, is preferably used as a positioner 211 (see FIGS. 6A-6B) in the positioning apparatus 200a (see FIGS. 6A-6B), such as the cutting apparatus 202 (see FIGS. 6A-6B), in the form of table saw 202a (see FIGS. 6A-6B), to provide for motion control 232 (see FIG. 8) and locking in a single control 218 (see FIG. 8), rather than motion and locking as two separate controls. In addition, the shaft locking assembly 10, such as in the form of the shaft locking assembly 10a, used as the positioner 211 (see FIGS. 6A-6B) may limit the locking positions to several discrete locking positions 217 (see FIG. 8). Moreover, since the plurality of castellations 36 (see FIGS. 1A, 2A) and the interlocking and corresponding projection members 92 (see FIGS. 1A, 2A) are protected by the support cap 46 (see FIGS. 1A, 2A), the plurality of castellations 36 and the interlocking and corresponding projection members 92 are protected from debris and fluids that may be generated or present during the cutting operation with the saw blade 204.

Figure 7A:
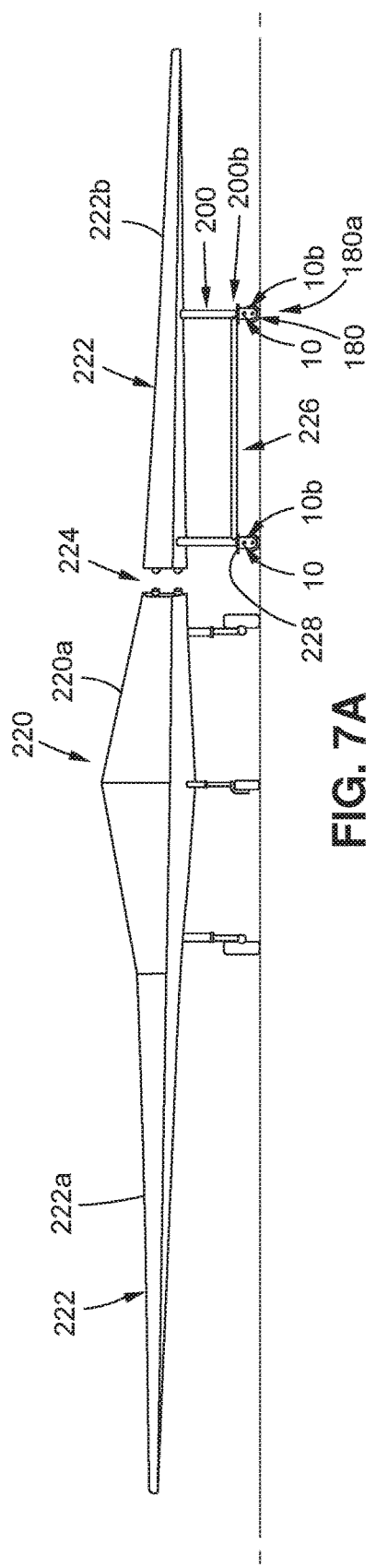
FIG. 7A is an illustration of a front view of a version of a shaft locking assembly of the disclosure, where the shaft locking assembly is used in a caster mounted apparatus in the form of a cart carrying a wing to be installed on an aircraft.
Figure 7C:
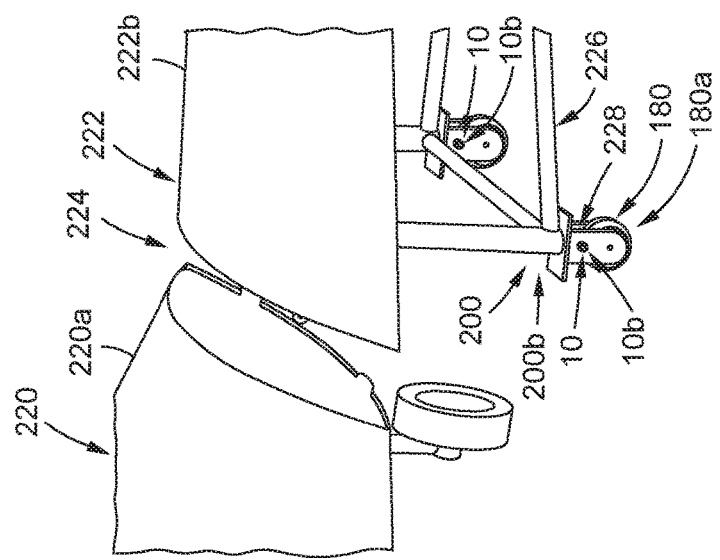
FIG. 7C is an illustration of a partial close-up front perspective view of the shaft locking assembly of circle 7C of FIG. 7B.
Figure 7B:
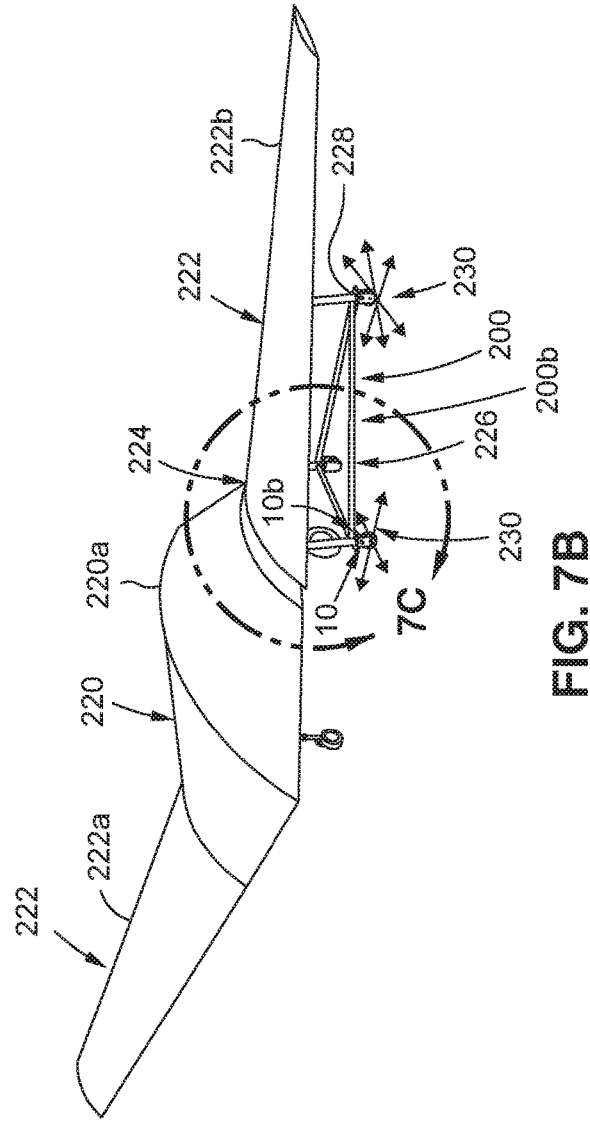
FIG. 7B is an illustration of a front perspective view of the shaft locking assembly and the cart with the wing of FIG. 7A.

Now referring to FIGS. 7A-7C, FIG. 7A is an illustration of a front view of a version of a shaft locking assembly 10, such as in the form of the shaft locking assembly 10b, of the disclosure, where the shaft locking assembly 10 is used in the caster mounted apparatus 200b in the form of a cart 226 carrying a wing 222, such as an unattached second wing 222b, to be installed on an aircraft 220a. FIG. 7B is an illustration of a front perspective view of the shaft locking assembly 10, such as in the form of the shaft locking assembly 10b, and the cart 226 with the wing 222, such as the unattached second wing 222b, of FIG. 7A. FIG. 7C is an illustration of a partial close-up front perspective view of the shaft locking assembly 10, such as in the form of the shaft locking assembly 10b, of circle 7C of FIG. 7B.

As shown in FIGS. 7A-7C, the shaft locking assembly 10, such as in the form of the shaft locking assembly 10b, is used in an apparatus 200, such as the caster mounted apparatus 200b, for example, in the form of cart 226. The shaft locking assembly 10 (see FIGS. 7A-7C), such as in the form of the shaft locking assembly 10b (see FIGS. 7A-7C), has a caster mounted design 228 (see FIGS. 7A-7C) with the caster wheel assembly 180 (see FIGS. 7A, 7C), such as in the form of the reduction drive caster wheel assembly 180a (see FIGS. 7A, 7C).

As further shown in FIGS. 7A-7C, an air vehicle 220, such as aircraft 220a, has wings 222, including an attached first wing 222a (see FIGS. 7A, 7B) and the unattached second wing 222b. As shown in FIGS. 7A-7C, the cart 226 with the shaft locking assemblies 10, such as in the form of the shaft locking assemblies 10b, may be used to carry and transport the wing 222, such as the unattached second wing 222b, to the aircraft 220a, for a wing installation operation 224 in the manufacturing process or in the field. The shaft locking assembly 10, such as in the form of the shaft locking assembly 10b, with the reduction drive caster wheel assembly 180a (see FIGS. 7A, 7C), allows for a precise motion control 232a (see FIG. 8) and unwanted movement elimination 236 (see FIG. 8) for the apparatus 200, such as the caster mounted apparatus 200b, for example, the cart 226. As shown in FIG. 7B, the shaft locking assembly 10, such as in the form of the shaft locking assembly 10b, with the caster mounted design 228, enables multiple direction movement 230, that is, movement in multiple directions, or in all directions.

Now referring to FIG. 8, FIG. 8 is an illustration of a functional block diagram showing exemplary versions of the shaft locking system 14 and the shaft locking assembly 10 of the disclosure. In another version there is provided the shaft locking system 14 (see FIG. 8) for use in an apparatus 200 (see FIG. 8), to provide motion control 232 (see FIG. 8) and unwanted movement elimination 236 (see FIG. 8) of the apparatus 200. As shown in FIG. 8, the apparatus 200 may comprise a positioning apparatus 200a, such as a milling apparatus 201, a cutting apparatus 202, machining equipment, or another suitable positioning apparatus 200a, such as used in manufacturing, machining, or assembling processes. As shown in FIG. 8, the apparatus 200 may further comprise a caster mounted apparatus 200b, such as a cart 226, a dolly 227, or another suitable caster mounted apparatus 200b.

As shown in FIG. 8, the shaft locking system 14 comprises the shaft locking assembly 10, such as in the form of shaft locking assembly 10a (see FIGS. 1A-1D), or such as in the form of shaft locking assembly 10b (see FIGS. 3A-4C). Preferably, the shaft locking assembly 10 is an automatic shaft locking assembly 12 (see FIG. 8).

As shown in FIG. 8, and as discussed above in detail, the shaft locking assembly 10 comprises the locking device 16 comprising the locking shaft 18 with the castellated ring element 20 disposed on the locking shaft 18. The castellated ring element 20 has the plurality of castellations 36 (see FIG. 8), such as the plurality of notches 36a (see FIG. 8). The locking shaft 18 has the splined portion 26 (see FIG. 8) on the exterior 30 (see FIG. 1A) of the locking shaft 18. The splined portion 26 has the plurality of exterior splines 28 (see FIG. 8). Further, the locking shaft 18 has the first end portion 22a (see FIG. 1A) with the first end 23a (see FIG. 1A), has the second end portion 22b (see FIG. 1A) with the second end 23b (see FIG. 1A), and has the body 24 (see FIG. 1A) with the splined portion 26.

As shown in FIG. 8, the shaft locking assembly 10 of the shaft locking system 14 further comprises the drive shaft 140 having the splined central through opening 148a with the plurality of interior splines 149, and has the cylindrical splined body portion 154a with the plurality of exterior splines 156. The splined portion 26 (see FIG. 8) of the locking shaft 18 (see FIG. 8) is disposed within, and corresponds to, the splined central through opening 148a (see FIG. 8) of the drive shaft 140 (see FIG. 8). Further, the drive shaft 140 has the first end portion 142a (see FIG. 1A), the second end portion 142b (see FIG. 1A), and the cylindrical body portion 154 (see FIG. 1A), such as the cylindrical splined body portion 154a (see FIGS. 1A, 8) with the exterior splines 156 (see FIGS. 1A, 8). The drive shaft 140 (see FIG. 8) has the drive end 150 (see FIG. 1C) with the drive opening 152 (see FIGS. 1C, 8). The drive opening 152 (see FIG. 1C) may comprise the square opening 152a (see FIG. 1C), the drive opening 152 (see FIG. 3B) may comprise the hexagonal opening 152b (see FIG. 3B), or the drive opening 152 may comprise another suitable geometric shape.

As shown in FIG. 8, the shaft locking assembly 10 may comprise the spring element 70, such as the metal spring 70a. The spring element 70 preferably imparts a locking force 74 (see FIG. 8), such as a spring force 76 (see FIG. 8), to the castellated ring element 20. The spring element 70 is preferably coupled between the castellated ring element 20 and the support cap 46, which is coupled to the retaining structure assembly 78. In particular, the spring element 70 is coupled between the first end 34a (see FIG. 1A) of the castellated ring element 20 (see FIGS. 1A, 8) and the interior wall portion 69 (see FIG. 2A) of the support cap 46 (see FIGS. 2A, 8). The spring element 70 has the central through opening 72 (see FIG. 1C) for receiving the first end portion 22a of the locking shaft 18.

As shown in FIG. 8, and as discussed above, the shaft locking assembly 10 further comprises the retaining structure assembly 78 to retain the locking device 16, the drive shaft 140, and the rotating element 115. The retaining structure assembly 78 has the side portion 91 (see FIG. 1A) with the plurality of projection members 92 (see FIG. 8), such as the plurality of mating castellations 92a (see FIG. 8), corresponding to the plurality of castellations 36 (see FIG. 8), such as the plurality of notches 36a (see FIG. 8), of the castellated ring element 20.

In one version, the retaining structure assembly 78 comprises the housing assembly 80 (see FIG. 8) comprised of the first housing portion 82 (see FIG. 1A) attached to the second housing portion 84 (see FIG. 1A). As shown in FIG. 8, the housing assembly 80 may be used with the rack and pinion assembly 112 comprising the rack 114, such as the linear rack 114a, with the plurality of rack teeth 120, coupled to the rotating element 115, such as the pinion 116, for example, the splined pinion 116a, with the plurality of pinion teeth 124. As shown in FIG. 8, the splined pinion 116a comprises the splined central through opening 130a with the plurality of interior splines 132, and the splined pinion 116a has the inner diameter 134. The rotating element 115, such as the splined pinion 116a translates rotational motion 135 (see FIG. 8) into linear motion 136 (see FIG. 8).

As shown in FIG. 8, the shaft locking assembly 10 of the shaft locking system 14 may further comprise the support cap 46 attached to the retaining structure assembly 78, and may further comprise the retainer clip 138 for retaining a portion of the drive shaft 140 within the housing assembly 80. The support cap 46 (see FIG. 8) covers and protects, or is configured to cover and protect, the castellated ring element 20 (see FIG. 8) and the first end portion 22a (see FIG. 1A) of the locking shaft 18 (see FIG. 8). The support cap 46 has the central opening 52 (see FIG. 1A) for insertion of the first end portion 22a of the locking shaft 18.

The shaft locking assembly 10, such as in the form of shaft locking assembly 10a, with the rack and pinion assembly 112, may be used as a positioner 211 (see FIG. 8) in the positioning apparatus 200a (see FIG. 8), such as the cutting apparatus 202 (see FIG. 8), in the form of table saw 202a (see FIGS. 6A-6B), to provide for motion control 232 (see FIG. 8) and locking in a single control 218 (see FIG. 8), rather than motion and locking as two separate controls. In addition, the shaft locking assembly 10, such as in the form of shaft locking assembly 10a, used as the positioner 211 (see FIG. 8) may limit the locking positions to several discrete locking positions 217 (see FIG. 8).

In another version, the shaft locking assembly 10, such as in the form of shaft locking assembly 10b, includes the retaining structure assembly 78 comprising the base assembly 184 (see FIG. 8) of the caster wheel assembly 180 (see FIG. 8). In this version, the shaft locking assembly 10, such as in the form of shaft locking assembly 10b, comprises the caster mounted design 228 (see FIG. 8). The base assembly 184 comprises one or more support plates 186 (see FIGS. 3A, 4A) coupled to the top plate 182 and coupled to yoke portions 188 (see FIGS. 3A, 4A), such as first yoke portion 188a (see FIGS. 3A, 4A) and second yoke portion 188b (see FIGS. 3A, 4A). As shown in FIG. 8, the caster wheel assembly 180 comprises the reduction drive caster wheel assembly 180a, or the direct drive caster wheel assembly 180b. As discussed above, and as shown in FIG. 8, the reduction drive caster wheel assembly 180a comprises the rotating element 115 in the form of the first gear 194 with first gear (FG) teeth 195. The first gear 194 is coupled to the second gear 197 with second gear (SG) teeth 198. In the direct drive caster wheel assembly 180b, the rotating element 115 comprises the wheel 181 (see FIG. 8). The rotating element 115 comprising the splined pinion 116a, the first gear 194, the wheel 181, or another suitable rotating element 115 is disposed around the cylindrical splined body portion 154a of the drive shaft 140.

As shown in FIG. 8, the shaft locking system 14 further comprises the shaft engagement device 158 for engaging the drive end 150 (see FIG. 1C) of the drive shaft 140 and the second end 23b (see FIG. 1A) of the locking shaft 18, and for actuating the locking shaft 18 from the locked position 166 to the unlocked position 168.

As shown in FIG. 8, the shaft engagement device 158 may comprise the actuation tool 160, such as the square driver 160a, a hex key 160b, a ratchet 160c, or another suitable actuation tool 160. As shown in FIG. 8, the shaft engagement device 158 may further comprise the electronic device 162, such as an electronic solenoid 162a, or another suitable electronic device 162. As shown in FIG. 8, the shaft engagement device 158 may further comprise the pneumatic device 164, such as a pneumatic solenoid 164a, an air valve assembly 164b, or another suitable pneumatic device 164. The electronic device 162 and the pneumatic device 164 may preferably be operated with a remote controlled operation 161 (see FIG. 8). The actuation tool 160 (see FIG. 8) may preferably be manually operated.

As shown in FIG. 8, the shaft locking system 14 further comprises the holding element 170, such as a cotter pin 170a, a clip 170b, or another suitable holding element 170. The holding element 170 is preferably inserted into the through opening 31 (see FIG. 8) formed through the first end portion 22a (see FIG. 1A) of the locking shaft 18 (see FIG. 8) of the locking device 16 (see FIG. 8). The holding element 170 (see FIG. 8) preferably holds the first end portion 22a of the locking device at an outward distance 172 (see FIG. 2B) from a first end 47*a* (see FIG. 2B) of the support cap 46 (see FIGS. 2B, 8).

As shown in FIG. 8, the shaft locking system 14 and shaft locking assembly 10 provide for motion control 232, such as precise motion control 232*a*, of the apparatus 200, provide for free motion 234 of the apparatus when the holding element 170 is utilized, and provide for unwanted movement elimination 236 and automatic locking 238 of the apparatus 200.

Figure 9:
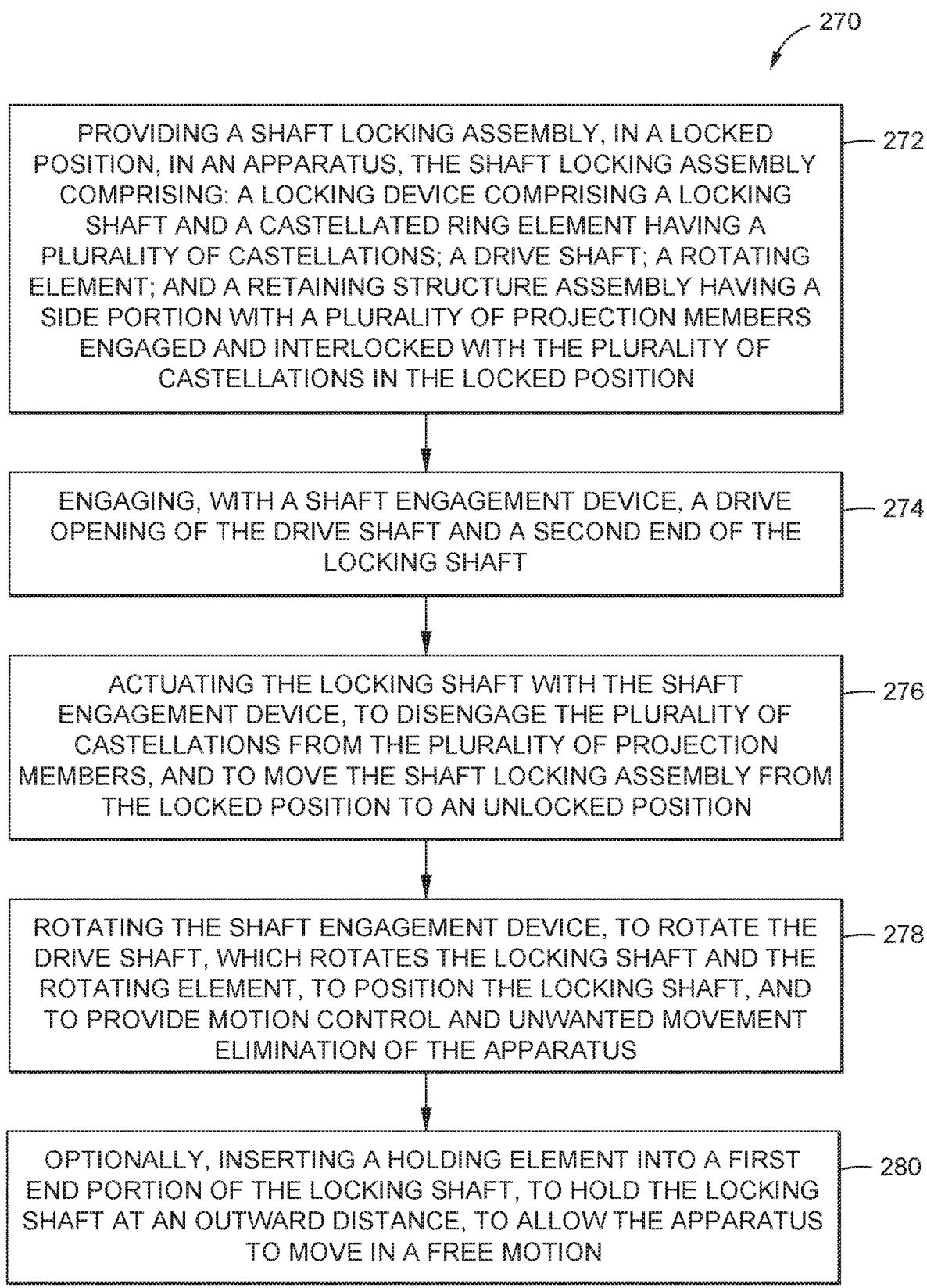
FIG. 9 is an illustration of a flow diagram of an exemplary version of a method of the disclosure.

Now referring to FIG. 9, FIG. 9 is an illustration of a flow diagram of an exemplary version of a method 270 of using a shaft locking assembly 10 (see FIGS. 1A, 3A, 4A, 8) in an apparatus 200 (see FIGS. 6A, 7A, 8), to provide motion control 232 (see FIG. 8) and unwanted movement elimination 236 (see FIG. 8) of the apparatus 200.

As shown in FIG. 9, the method 270 comprises step 272 of providing the shaft locking assembly 10 in a locked position 166 (see FIGS. 2A, 3C, 8) in the apparatus 200. As discussed in detail above, the shaft locking assembly 10 comprises the locking device 16 (see FIGS. 1A, 3C, 4C, 8) comprising the locking shaft 18 (see FIGS. 1A, 3C, 4C, 8) having the first end 23*a* (see FIGS. 1A, 3C, 4C, 8) and the second end 23*b* (see FIGS. 1A, 3C, 4C, 8), and having the castellated ring element 20 (see FIGS. 1A, 3C, 4C, 8) disposed on the locking shaft 18. The castellated ring element 20 having the plurality of castellations 36 (see FIGS. 1A, 3C, 4C, 8), such as in the form of the plurality of notches 36*a* (see FIGS. 1A, 3C, 4C, 8). The locking shaft 18 has the splined portion 26 (see FIGS. 1A, 3C, 4C, 8) on the exterior 30 (see FIG. 1A) of the locking shaft 18.

As discussed in detail above, the shaft locking assembly 10 further comprises the drive shaft 140 (see FIGS. 1A, 3C, 4C, 8) having the drive end 150 (see FIGS. 1C, 3B, 4B) with the drive opening 152 (see FIGS. 1C, 3B, 4B, 8), and having the splined central through opening 148*a* (see FIGS. 1A, 3C, 4C, 8), wherein the splined portion 26 of the locking shaft 18 is disposed within, and corresponds to, the splined central through opening 148*a* of the drive shaft 140.

As discussed in detail above, the shaft locking assembly 10 further comprises the rotating element 115 (see FIGS. 1A, 3A, 4A, 8) disposed around the exterior portion 146*a* (see FIGS. 1B, 2A, 3C, 4C) of the drive shaft 140.

As discussed in detail above, the shaft locking assembly 10 further comprises the retaining structure assembly 78 (see FIGS. 1A, 3C, 4C, 8) retaining the locking device 16, the drive shaft 140, and the rotating element 115. The retaining structure assembly 78 has the side portion 91 (see FIGS. 1A, 3C, 5B) with the plurality of projection members 92 (see FIGS. 1A, 3C, 5B, 8), such as the plurality of mating castellations 92*a* (see FIGS. 1A, 3C, 5B, 8), engaged and interlocked with the plurality of castellations 36 in the locked position 166.

In one version, as discussed above, the shaft locking assembly 10, such as in the form of shaft locking assembly 10*a* (see FIGS. 1A-1D), has the rack and pinion design 111 (see FIGS. 1A-1D), with the retaining structure assembly 78 comprising the housing assembly 80 (see FIGS. 1A-1D) having the first housing portion 82 (see FIGS. 1A-1D) attached to the second housing portion 84 (see FIGS. 1A-1D), and with the rotating element 115 (see FIGS. 1A-1C) comprising the splined pinion 116*a* (see FIGS. 1A-1C) coupled to the rack 114 (see FIGS. 1A-1D) that is slidably disposed through the recessed slot opening 102 (see FIGS. 1A-1D) of the first housing portion 82, to control the linear motion 136 (see FIG. 8), and to provide discrete locking positions 217 (see FIG. 8) for the shaft locking assembly 10.

In another version, the shaft locking assembly 10, such as in the form of shaft locking assembly 10*b* (see FIGS. 3A-3C, 4A-4C) has the caster mounted design 228 (see FIGS. 3A, 4A) with the retaining structure assembly 78 (see FIGS. 3A, 4A) comprising the base assembly 184 (see FIGS. 3A, 4A) of the caster wheel assembly 180 (see FIGS. 3A, 4A). The base assembly 184 comprises of one or more support plates 186 (see FIGS. 3A, 4A) coupled to yoke portions 188 (see FIGS. 3A, 4A), such as the first yoke portion 188*a* (see FIGS. 3A, 4A) and to the second yoke portion 188*b* (see FIGS. 3A, 4A). The rotating element 115 (see FIGS. 3A, 4A) comprises one of, the first gear 194 (see FIG. 3A) of the reduction drive caster wheel assembly 180*a* (see FIG. 3A), or the wheel 181 (see FIG. 4A) of the direct drive caster wheel assembly 180*b* (see FIG. 4A), to provide precise motion control 232*a* (see FIG. 8) of the apparatus 200 (see FIG. 8).

As shown in FIG. 9, the method 270 further comprises step 274 of engaging, with the shaft engagement device 158 (see FIGS. 2B, 4C, 8), the drive opening 152 (see FIGS. 2B, 4C, 8) of the drive shaft 140 (see FIGS. 2B, 4C, 8) and the second end 23*b* (see FIGS. 2B, 4C) of the locking shaft 18 (see FIGS. 2B, 4C). The step 274 (see FIG. 9) of engaging, with the shaft engagement device 158, may further comprise engaging, with the shaft engagement device 158 comprising one of, the actuation tool 160 (see FIG. 2B, 8), such as a square driver 160*a* (see FIG. 8), a hex key 160*b* (see FIG. 8), a ratchet 160*c* (see FIG. 8), or another suitable actuation tool 160; the electronic device 162 (see FIG. 8), such as an electronic solenoid 162*a* (see FIG. 8); the pneumatic device 164 (see FIG. 8), such as a pneumatic solenoid 164*a* (see FIG. 8) or an air valve assembly 164*b* (see FIG. 8; or another suitable shaft engagement device 158.

As shown in FIG. 9, the method 270 further comprises step 276 of actuating the locking shaft 18 with the shaft engagement device 158, to disengage the plurality of castellations 36 (see FIGS. 2B, 5B) from the plurality of projection members 92 (see FIGS. 2B, 5B), and to move the shaft locking assembly 10 from the locked position 166 (see FIGS. 2A, 3C, 8) to the unlocked position 168 (see FIGS. 2B, 4C, 5B, 8).

As shown in FIG. 9, the method 270 further comprises step 278 of rotating the shaft engagement device 158, to rotate the drive shaft 140, which rotates, such as simultaneously rotates, the locking shaft 18 and the rotating element 115, to position the locking shaft 18, and to provide motion control 232 (see FIG. 8) and unwanted movement elimination 236 (see FIG. 8) of the apparatus 200 (see FIGS. 6A, 7A, 8).

As shown in FIG. 9, after the step 278 of rotating the shaft engagement device 158, the method 270 may further optionally comprise step 280 of inserting the holding element 170 (see FIGS. 2B, 4A, 5A, 8) into the through opening 31 (see FIGS. 2B, 4C, 5B, 8) of the first end portion 22*a* (see FIGS. 2B, 4C, 5B) of the locking shaft 18 (see FIGS. 2B, 4C, 5B, 8), to hold the locking shaft 18 at an outward distance 172 (see FIGS. 2B, 5B), to allow the apparatus 200 (see FIG. 8) to move in a free motion 234 (see FIG. 8).

Figure 10:
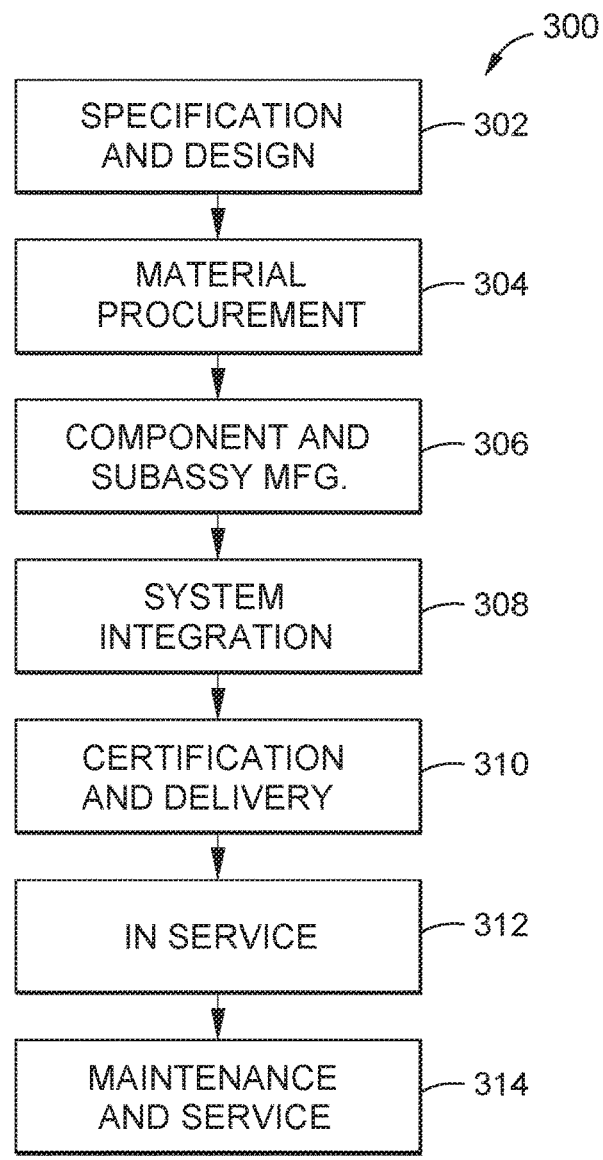
FIG. 10 is an illustration of a flow diagram of a version of an aircraft manufacturing and service method.
Figure 11:
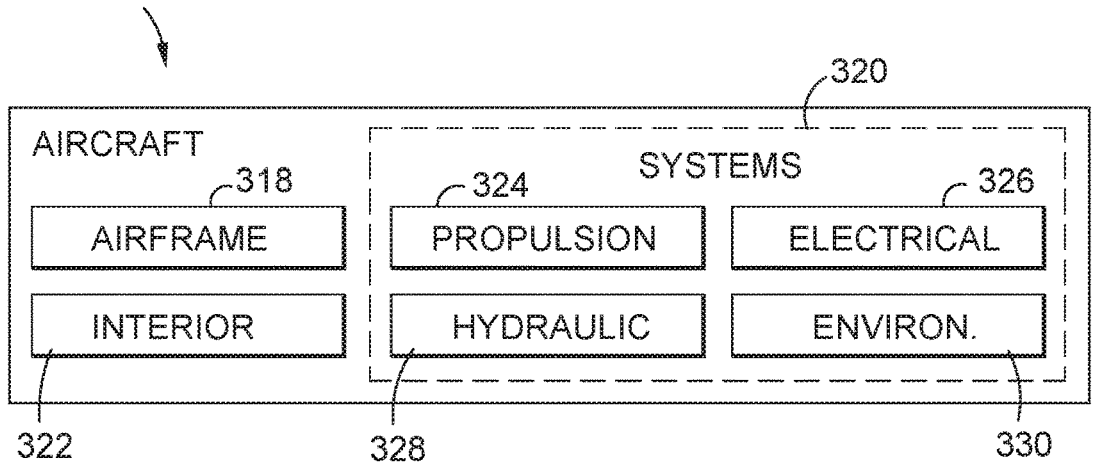
FIG. 11 is an illustration of a functional block diagram of a version of an aircraft.

Now referring to FIGS. 10 and 11, FIG. 10 is an illustration of a flow diagram of an aircraft manufacturing and service method 300, and FIG. 11 is an illustration of a block diagram of an aircraft 316. Referring to FIGS. 10 and 11, versions of the disclosure may be described in the context of the aircraft manufacturing and service method 300 as shown in FIG. 10, and the aircraft 316 as shown in FIG. 11.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 11, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed embodiments of the shaft locking assembly 10 (see FIGS. 1A, 3A, 4A, 8), the shaft locking system 14 (see FIGS. 2B, 4C, 8), and the method 270 (see FIG. 8) provide for a shaft locking device that uses a locking force 74 (see FIG. 8), such as a spring force 76 (see FIG. 8), a locking shaft 18 that is splined, a drive shaft 140 that is splined, and a rotating element 115, such as in the form of a pinion 116 (see FIG. 8), a first gear 194 (see FIG. 8), or a wheel 181 (see FIG. 8), to allow for automatic locking 238 (see FIG. 8) of the locking device 16 (see FIG. 8) and the shaft locking assembly 10, upon removal of the shaft engagement device 158 (see FIGS. 2B, 4C, 8), such as the driving or enabling component. In addition, the shaft locking assembly 10 (see FIGS. 1A, 3A, 4A, 8) allows for freedom of actuation with immediate locking, upon removal of the shaft engagement device 158 (see FIGS. 2B, 4C, 8), and eliminates any unwanted or unexpected movement of the apparatus 200 (see FIGS. 6A, 7A, 8) with the shaft locking assembly 10, when not directly enabled by the shaft engagement device 158 (see FIGS. 2B, 4C, 8), or other enabling component. Moreover, the shaft locking assembly 10 (see FIGS. 1A, 3A, 4A, 8) may be effective in all temperatures, in the presence of moisture, including submersion, or liquids, such as water or oil, and is capable of resisting high loads.

In addition, disclosed embodiments of the shaft locking assembly 10 (see FIGS. 1A, 3A, 4A, 8), the shaft locking system 14 (see FIGS. 2B, 4C, 8), and the method 270 (see FIG. 8) do not rely on friction to limit rotation, and coordinate the locking and unlocking action of the castellated ring element 20 (see FIGS. 1A, 3C, 4C, 5B) and the torque input drive of the shaft engagement device 158 (see FIGS. 2B, 4C, 8), to allow for motion control 232, such as precise motion control 232a, of the apparatus 200, and positive shaft locking when the shaft engagement device 158 (see FIGS. 2B, 4C, 8) is not being applied. Further, the shaft locking assembly 10 (see FIGS. 1A, 3A, 4A, 8) may be used in various apparatuses 200 (see FIG. 8), including caster mounted devices, rotary equipment, such as tooling and linear positioning, and assemblies that are positioned or moved in a manufacturing or field service environment.

In addition, disclosed embodiments of the shaft locking assembly 10 (see FIGS. 1A, 3A, 4A, 8), the shaft locking system 14 (see FIGS. 2B, 4C, 8), and the method 270 (see FIG. 8) provide for unwanted movement elimination 236 (see FIG. 8) and automatic locking 238 (see FIG. 8) of an apparatus 200, such as the wheels 181 (see FIGS. 3A, 4A) of casters, carts 226 (see FIGS. 7A, 8), dollies 227 (see FIG. 8), and similar devices. This is accomplished by splining the drive shaft 140 (see FIGS. 1A, 8) and the locking shaft 18 (see FIGS. 1A, 8) of the shaft locking assembly 10 (see FIGS. 1A, 3A, 4A, 8) into the retaining structure assembly 78 (see FIG. 8), such as the housing assembly 80 (see FIG. 8) or the base assembly 184 (see FIG. 8) of the shaft locking assembly 10 (see FIGS. 1A, 3A, 4A, 8), by using the shaft engagement device 158 (see FIGS. 2B, 4C, 8) to drive the locking shaft 18 (see FIGS. 1A, 8). When the shaft engagement device 158 (see FIGS. 2B, 4C, 8) is removed from the shaft locking assembly 10 (see FIGS. 1A, 3A, 4A, 8), the shaft locking assembly 10 (see FIGS. 1A, 3A, 4A, 8) goes into the locked position 166 (see FIG. 8), preventing unwanted movement. The shaft engagement device 158 (see FIGS. 2B, 4C, 8) may comprise the actuation tool 160 with manual operation, or may comprise the electronic device 162 (see FIG. 8) or the pneumatic device 164 (see FIG. 8) that may be controlled with a remote controlled operation 161 (see FIG. 8).

Moreover, disclosed embodiments of the shaft locking assembly 10 (see FIGS. 1A, 3A, 4A, 8), shaft locking system 14 (see FIGS. 2B, 4C, 8), and method 270 (see FIG. 8) provide for a shaft locking assembly 10 that may function as a positioner 211 (see FIG. 8), for example, with a positioning apparatus 200a (see FIG. 8), such as a milling apparatus 201 (see FIG. 8) or a cutting apparatus 202 (see FIG. 8). When acting as the positioner 211 (see FIG. 8), the shaft locking assembly 10 provides for a single control 218 (see FIG. 8) and discrete locking positions 217 (see FIG. 8) to be locked in. This positioning version may have the rack and pinion design 111 (see FIG. 1A). Alternatively, the shaft locking assembly 10 (see FIGS. 1A, 3A, 4A, 8) may have the caster mounted design 228 (see FIGS. 3A, 4A) with the reduction drive caster wheel assembly 180a (see FIG. 3A), or the direct drive caster wheel assembly 180b (see FIG. 4A). The geared drive version, such as the reduction drive caster wheel assembly 180a (see FIG. 3A), allows for precise motion control 232a (see FIG. 8), or fine motion control, and once in place, automatic wheel brakes prevent further movement. In addition, being mounted to the caster enables movement in multiple or all directions, for example, multiple direction movement 230 (see FIG. 7B). Further, disclosed embodiments of the shaft locking assembly 10 (see FIGS. 1A, 3A, 4A, 8), shaft locking system 14 (see FIGS. 2B, 4C, 8), and method 270 (see FIG. 8) provide for both the ability of an apparatus 200 (see FIG. 8) to move in a controlled manner and to be locked in one position to prevent rotation of caster mounted devices, rotary equipment, and assemblies to be positioned or moved.

In addition, disclosed embodiments of the shaft locking assembly 10 (see FIGS. 1A, 3A, 4A, 8), shaft locking system 14 (see FIGS. 2B, 4C, 8), and method 270 (see FIG. 8) provide for a holding element 170, such as a cotter pin 170*a* or a clip 170*b*, to hold the first end portion 22*a* (see FIG. 1A) of the locking shaft 18 (see FIGS. 1A, 2B, 5B) out at an outward distance 172 (see FIGS. 2B, 5B), to allow for free motion 234 (see FIG. 8), wherein the wheels 181 (see FIGS. 3A, 4A) are free to swivel or move in any direction. Further, a load protection may also be available for the shaft locking assembly 10 (see FIGS. 1A, 3A, 4A, 8) by shearing a section at some preselected torque, which will shear the shaft locking assembly 10 (see FIGS. 1A, 3A, 4A, 8), when that torque is reached, thus making the apparatus 200 (see FIG. 8) with the shaft locking assembly 10 (see FIGS. 1A, 3A, 4A, 8) move freely.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A shaft locking assembly for use in an apparatus, to provide motion control and unwanted movement elimination of the apparatus, the shaft locking assembly comprising:
    a locking device comprising a locking shaft with a castellated ring element disposed on the locking shaft, the castellated ring element having a plurality of castellations, and the locking shaft having a splined portion on an exterior of the locking shaft;
    a drive shaft having a splined central through opening, wherein the splined portion of the locking shaft is disposed within, and corresponds to, the splined central through opening of the drive shaft;
    a rotating element disposed around an exterior portion of the drive shaft; and
    a retaining structure assembly retaining the locking device, the drive shaft, and the rotating element, and the retaining structure assembly having a side portion with a plurality of projection members corresponding to the plurality of castellations of the castellated ring element, wherein the retaining structure assembly comprises a housing assembly comprised of a first housing portion attached to a second housing portion, the first housing portion having a recessed slot opening, and having a central through opening for housing the rotating element and partially housing the drive shaft and the locking shaft,
    wherein the shaft locking assembly is in a locked position when the plurality of castellations are engaged and interlocked with the plurality of projection members, and further wherein the shaft locking assembly moves from the locked position to an unlocked position, when a shaft engagement device is engaged with the drive shaft and the locking shaft, and actuates the locking shaft, so that the plurality of castellations are disengaged and unlocked from the plurality of projection members, and the shaft engagement device rotates the drive shaft, which rotates the locking shaft and the rotating element, to provide motion control and unwanted movement elimination of the apparatus.

2. The shaft locking assembly of claim 1, further comprising a support cap coupled to the retaining structure assembly, the support cap covering the castellated ring element and a first end portion of the locking shaft, and the support cap having a central opening for insertion of the first end portion of the locking shaft.

3. The shaft locking assembly of claim 1, further comprising a spring element coupled between the castellated ring element and a support cap coupled to the retaining structure assembly, the spring element providing a spring force to the castellated ring element.

4. The shaft locking assembly of claim 1, wherein the locking shaft has a first end portion with a through opening, for receiving a holding element, to hold the locking shaft at an outward distance, to allow the apparatus to move in a free motion, wherein the holding element comprises one of, a cotter pin, and a clip.

5. The shaft locking assembly of claim 1, wherein the first housing portion and the second housing portion each have base foot portions configured to attach the first housing portion and the second housing portion to the apparatus that the shaft locking assembly is used in.

6. The shaft locking assembly of claim 1, wherein the rotating element comprises a splined pinion having a splined central through opening corresponding to a cylindrical splined body portion of the drive shaft.

7. The shaft locking assembly of claim 6, wherein the splined pinion is coupled to a rack that is slidably disposed through the recessed slot opening of the first housing portion, such that the rack and the splined pinion provide discrete locking positions for the shaft locking assembly.

8. The shaft locking assembly of claim 1, wherein the retaining structure assembly comprises a base assembly of a caster wheel assembly, the base assembly comprised of one or more support plates coupled to a first yoke portion and to a second yoke portion.

9. The shaft locking assembly of claim 8, wherein the caster wheel assembly comprises a reduction drive caster wheel assembly, and wherein the rotating element comprises a first gear coupled between the first yoke portion and the second yoke portion, the first gear further coupled to a second gear to form a reduction drive assembly.

10. The shaft locking assembly of claim 8, wherein the caster wheel assembly comprises a direct drive caster wheel assembly, and wherein the rotating element comprises a wheel coupled between the first yoke portion and the second yoke portion, and further wherein the locking shaft and the drive shaft are inserted through a central through opening of the wheel.

11. The shaft locking assembly of claim 1, wherein the shaft engagement device comprises one of, an actuation tool, an electronic device, and a pneumatic device.

12. The shaft locking assembly of claim 1, wherein the apparatus comprises one of, a positioning apparatus, and a caster mounted apparatus.

13. A shaft locking system for use in an apparatus, to provide motion control and unwanted movement elimination of the apparatus, the shaft locking system comprising:

a shaft locking assembly comprising:
  a locking device comprising a locking shaft with a castellated ring element disposed on the locking shaft, the castellated ring element having a plurality of castellations, and the locking shaft having a splined portion on an exterior of the locking shaft;
  a drive shaft having a splined central through opening, wherein the splined portion of the locking shaft is disposed within, and corresponds to, the splined central through opening of the drive shaft, and the drive shaft further having a cylindrical splined body portion;
  a rotating element disposed around the cylindrical splined body portion of the drive shaft;
  a retaining structure assembly retaining the locking device, the drive shaft, and the rotating element, and the retaining structure assembly having a side portion with a plurality of projection members corresponding to the plurality of castellations of the castellated ring element; and
  a support cap coupled to the retaining structure assembly, the support cap covering the castellated ring element and a first end portion of the locking shaft, the support cap having a central opening for insertion of the first end portion of the locking shaft;
a shaft engagement device for engaging a drive end of the drive shaft and a second end portion of the locking shaft, and for actuating the locking shaft from a locked position to an unlocked position; and
a holding element inserted into a through opening formed through the first end portion of the locking shaft, the holding element holding the first end portion at an outward distance from a first end of the support cap,
wherein the shaft locking assembly is in the locked position when the plurality of castellations are engaged and interlocked with the plurality of projection members, and further wherein the shaft locking assembly moves from the locked position to an unlocked position, when a shaft engagement device is engaged with the drive shaft and the locking shaft, and actuates the locking shaft, so that the plurality of castellations are disengaged and unlocked from the plurality of projection members, and the shaft engagement device rotates the drive shaft, which rotates the locking shaft and the rotating element, to provide motion control and unwanted movement elimination of the apparatus.

14. The shaft locking system of claim 13, wherein the shaft locking assembly further comprises a spring element coupled between the castellated ring element and an interior wall portion of the support cap, the spring element providing a spring force to the castellated ring element.

15. The shaft locking system of claim 13, wherein the rotating element comprises one of, a splined pinion of a rack and pinion assembly, a first gear of a reduction drive caster wheel assembly, and a wheel of a direct drive caster wheel assembly.

16. The shaft locking system of claim 13, wherein the retaining structure assembly comprises one of, a housing assembly comprised of a first housing portion attached to a second housing portion; and a base assembly of a caster wheel assembly, the base assembly comprised of one or more support plates coupled to a first yoke portion and to a second yoke portion.

17. A method of using a shaft locking assembly in an apparatus, to provide motion control and unwanted movement elimination of the apparatus, the method comprising the steps of:
  providing the shaft locking assembly in a locked position in the apparatus, the shaft locking assembly comprising:
    a locking device comprising a locking shaft having a first end and a second end, and having a castellated ring element disposed on the locking shaft, the castellated ring element having a plurality of castellations, and the locking shaft having a splined portion on an exterior of the locking shaft;
    a drive shaft having a drive end with a drive opening, and having a splined central through opening, wherein the splined portion of the locking shaft is disposed within, and corresponds to, the splined central through opening of the drive shaft;
    a rotating element disposed around an exterior portion of the drive shaft; and
    a retaining structure assembly retaining the locking device, the drive shaft, and the rotating element, and the retaining structure assembly having a side portion with a plurality of projection members engaged and interlocked with the plurality of castellations in the locked position, wherein the retaining structure assembly comprises a housing assembly comprised of a first housing portion attached to a second housing portion, the first housing portion having a recessed slot opening, and having a central through opening for housing the rotating element and partially housing the drive shaft and the locking shaft;
  engaging, with a shaft engagement device, the drive opening of the drive shaft and the second end of the locking shaft;
  actuating the locking shaft with the shaft engagement device, to disengage the plurality of castellations from the plurality of projection members, and to move the shaft locking assembly from the locked position to an unlocked position; and
  rotating the shaft engagement device, to rotate the drive shaft, which rotates the locking shaft and the rotating element, to position the locking shaft, and to provide motion control and unwanted movement elimination of the apparatus.

18. The method of claim 17, further comprising after rotating the shaft engagement device, inserting a holding element into a first end portion of the locking shaft, to hold the locking shaft at an outward distance, to allow the apparatus to move in a free motion.

19. The method of claim 17, wherein providing the shaft locking assembly comprises providing the shaft locking assembly having a rack and pinion assembly design, with the retaining structure assembly comprising a housing assembly having a first housing portion attached to a second housing portion, and with the rotating element comprising a splined pinion coupled to a rack that is slidably disposed through a slot opening of the first housing portion, to control a linear motion, and to provide discrete locking positions for the shaft locking assembly.

20. The method of claim 17, wherein providing the shaft locking assembly comprises providing the shaft locking assembly having a caster mounted design with the retaining structure assembly comprising a base assembly of a caster wheel assembly, the base assembly comprised of one or more support plates coupled to a first yoke portion and to a second yoke portion, and with the rotating element comprising one of, a first gear of a reduction drive caster wheel assembly, and a wheel of a direct drive caster wheel assembly, to provide a precise motion control of the apparatus.

21. The method of claim 17, wherein engaging, with the shaft engagement device, comprises engaging, with the shaft engagement device comprising one of, an actuation tool, an electronic device, and a pneumatic device.

\* \* \* \* \*